United States Patent
Ekin et al.

(10) Patent No.: US 12,106,533 B2
(45) Date of Patent: Oct. 1, 2024

(54) METHOD AND SYSTEM FOR SEGMENTING INTERVENTIONAL DEVICE IN IMAGE

(71) Applicant: KONINKLIJKE PHILIPS N.V., Eindhoven (NL)

(72) Inventors: Ahmet Ekin, Eindhoven (NL); Wilhelmus Henrica Gerarda Maria Van Den Boomen, Valkenswaard (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 413 days.

(21) Appl. No.: 17/489,840

(22) Filed: Sep. 30, 2021

(65) Prior Publication Data

US 2022/0101034 A1 Mar. 31, 2022

Related U.S. Application Data

(60) Provisional application No. 63/085,181, filed on Sep. 30, 2020.

(51) Int. Cl.
*G06V 10/25* (2022.01)
*G06T 7/11* (2017.01)
(Continued)

(52) U.S. Cl.
CPC .............. *G06V 10/25* (2022.01); *G06T 7/11* (2017.01); *G06V 10/462* (2022.01); *G06V 10/50* (2022.01);
(Continued)

(58) Field of Classification Search
CPC ...... G06V 10/25; G06V 10/462; G06V 10/50; G06V 2201/03; G06V 2201/034;
(Continued)

(56) References Cited

U.S. PATENT DOCUMENTS

| 9,905,008 B2 * | 2/2018 | Katuwal ............... G06T 7/0002 |
| 2018/0218514 A1 | 8/2018 | Berger |

(Continued)

FOREIGN PATENT DOCUMENTS

| CN | 109166133 A | 1/2019 |
| KR | 20190130310 A | 11/2019 |
| WO | 2020089416 A1 | 5/2020 |

OTHER PUBLICATIONS

Fragi, A. et al., "Multiscale vessel enhancement filtering," LNCS, vol. 1496, pp. 130-137 (Germany 1998).
(Continued)

*Primary Examiner* — Christopher M Brandt

(57) ABSTRACT

A method is provided for segmenting an image of a region of interest of a subject. The method includes receiving training images, at least some of which include a training interventional device; constructing ground truth data, including at least a ground truth image, for each training image; training a segmentation model using the training images based on intensity and vesselness features in the training images and the associated ground truth images; acquiring a new test image showing the region of interest; extracting vesselness values of pixels or voxels from the new test image; dividing the new test image into multiple patches; and performing segmentation of the new test image using the trained segmentation model to generate a segmentation image, corresponding to the new test image, with values indicating for each pixel or voxel in the segmentation image a presence or an absence of an interventional device.

8 Claims, 16 Drawing Sheets

(51) Int. Cl.
G06V 10/46 (2022.01)
G06V 10/50 (2022.01)
(52) U.S. Cl.
CPC ............ G06T 2207/20081 (2013.01); G06T 2207/30101 (2013.01)
(58) Field of Classification Search
CPC ............ G06T 7/11; G06T 2207/20081; G06T 2207/30101; G06T 2207/10081; G06T 2207/10088; G06T 2207/10116; G06T 2207/10132; G06T 2207/20084; G06T 2207/30021
See application file for complete search history.

(56) References Cited

U.S. PATENT DOCUMENTS

2019/0205606 A1* 7/2019 Zhou .................. G06F 18/285
2019/0378291 A1 12/2019 Comaniciu
2020/0349712 A1* 11/2020 Siemionow ............ G06T 7/11

OTHER PUBLICATIONS

Ronneberger, O. et al., "U-Net: Convolutional Networks for Biomedical Image Segmentation," MICCAI (2015).
Smith, L., "Cyclical Learning Rates for Training Neural Networks," WACV (2017).
Smith, L., "A disciplined approach to neural network hyperparameters: Part 1—learning rate, batch size, momentum, and weight decay," US Naval Research Lab Technical Report 5510-26 (2018).
Dijkstra, E.W., "A note on two problems in connexion with graphs," Numerische Mathermatik, 1:269-271 (1959).
Sutskever, I. et al., "On the Importance of Initialization and Momentum in Deep Learning," Proc. ICML, vol. 28, pp. III-1139:III-1147 (Jun. 2013).
Yang, H. et al., "Automated Catheter Localization in Volumetric Ultrasound Using 3D Patch-Wise U-Net with Focal Loss." 2019 IEEE International Conference on Image Processing (ICIP), 2019, pp. 1346-1350, doi: 10.1109/ICIP.2019.8803045.
Zhang, F. et al., "Towards Vision-Based Deep Reinforcement Learning for Robotic Motion Control." arXiv:1511.03791 (2015).
Yang, H. et al., "Feature study on catheter detection in three-dimensional ultrasound." Proc. of SPIE, vol. 10576, Medical Imaging 2018: Image-Guided Procedures, Robotic Interventions, and Modeling.
Yang, H. et al., "Catheter localization in 3D ultrasound using voxel-of-interest-based ConvNets for cardiac intervention." Intrnational Journal of Computer Assisted Radiology and Surgery (2019) 14:1069-1077.
Yang, H. et al., "Catheter segmentation in three-dimensional ultrasound images by feature fusion and model fitting." J. Med. Imag. 6(1), 015001 (2019).
Grisan, E., "Boosted learned kernels for data-driven vesselness measure". Medical Imaging 2017: Biomedical Applications in Molecular, Structural and Functional Imaging. Proc. of SPIE, vol. 10137.
You, H. et al., "Automatic control of cardiac ablation catheter with deep reinforcement learning method." Journal of Mechanical Science and Technology 33 (11) (2019) 5415-5423.

* cited by examiner

METHOD AND SYSTEM FOR SEGMENTING INTERVENTIONAL DEVICE IN IMAGE

BACKGROUND

In minimally invasive therapies and surgeries, an interventional device is inserted into the body of a subject, and medical images are acquired to provide information regarding positions of the interventional device. Such medical images may include x-ray images, computed tomography (CT) images and magnetic resonance imaging (MRI) images, for example. In many applications, extraction of the position information is needed for segmentation and registration to other modalities, such as pre-op CT and Fiber Optic RealShape® (FORS) technologies. Automatic and robust extraction of the position information improves workflow efficiency and accuracy, both of which may be hampered by the conventional semi-automatic methods.

Determining the position information involves the extraction and segmentation of the interventional device from the medical images for a number of reasons. For example, the imaged scene that includes the interventional device in a surrounding region of interest of a subject may be very busy. There may be multiple objects present in the medical images, in addition to the interventional device, such as surgical tools and therapy devices (e.g., stent grafts and wires). Also, the interventional device may be a floppy device, such as a guidewire, that is flexible and may be bent and positioned in various desired locations. This means geometric constraints on the positioning of the interventional device are not applicable. In addition, x-ray images in particular may be acquired at different quality levels. Even in the same run, the first frame of x-ray images is often worse in quality than the last frame. Accordingly, conventional segmentation algorithms may not be sufficiently robust to accommodate these variations in image quality.

Further, when the interventional device is a guidewire, it may be located inside another object or device, such as a catheter, for example. In this case, a large portion of the guidewire will appear inside the catheter, possibly obscuring images of the guidewire. In addition, the guidewire and catheter may be located inside a sheath, which may be located inside a stent graft. Again, conventional segmentation algorithms may not be sufficiently robust to accommodate resulting variations in appearance and interactions with the other devices.

Segmentation of interventional devices from x-ray images is an important step in building semantically relevant applications. The x-ray images acquired during surgical interventions may include surgical or imaging objects in the view, making device segmentation difficult. Low-level filters based on traditional image processing techniques result in many false positives in these cases.

In addition, deep learning algorithms may be used to improve various aspects of the segmentation process. Generally, performance of a deep learning algorithm improves with richer data. Richer data does not necessarily mean a larger amount of data. Rather, variation in the data available for training the deep learning algorithm is more important for performance of the deep learning algorithm. It is likely that, sometime after deployment of the deep learning algorithm, new types of data or data with much different characteristics than the original training data, will be fed to the deep learning algorithm. In those cases, performance of the deep learning algorithm will drop significantly. If this new data is the new normal, the change will negatively influence the experienced deep learning algorithm performance, resulting in user dissatisfaction, causing inefficiencies and incorrect results, and possibly ending use of the deep learning algorithm. In order to accommodate the change, the new type of data and/or new data with the different characteristics will need to be collected and annotated to construct appropriate ground truth data, learn a new segmentation model, and update the software. Depending on complexity, this process may take a long time and may be financially costly.

SUMMARY

According to an aspect of the present disclosure, a method is provided for segmenting an image of a region of interest of a subject. The method includes receiving training images, at least some of the training images including at least one training interventional device; constructing ground truth data, including at least a ground truth image, for each training image; training a segmentation model using the plurality of training images based on intensity and vesselness features in the training images and the ground truth images associated with the training images; acquiring a new test image showing the region of interest of the subject; extracting vesselness values of pixels or voxels from the new test image dividing the new test image into multiple patches; and performing segmentation of the new test image using the trained segmentation model to generate a segmentation image, corresponding to the new test image, with values indicating for each pixel or voxel in the segmentation image a presence or an absence of at least one interventional device.

According to another aspect of the present disclosure, a method is provided for generating patches in an image of an interventional device for performing a deep learning image analysis of the image. The method includes dividing the image of the interventional device into multiple data units, each data unit having multiple pixels or voxels; determining a selected pixel or voxel from among the multiple pixels or voxels in each data unit to be a key point corresponding to the data unit by applying an operation to determine a rank order of the pixels or voxels based on a feature, and determining the selected pixel or voxel to be the key point according to the rank order; determining spatial positions of the key points in the image; determining strengths of the key points in the image, and distributions of the determined strengths of the key points; sorting the key points in a ranked order from most salient to least salient based on the determined strengths of the key points; computing a number N of salient key points from the determined strengths of the key points, the determined distributions of the determined strengths of the key points, and the determined spatial positions of the key points; selecting the number N of the sorted key points in the ranked order; and generating patches in the image using the selected key points.

According to another aspect of the present disclosure, a method is provided for adapting a deep learning algorithm for performing segmentation of an image. The method includes receiving training images for training the deep learning algorithm; generating device segmentation maps indicating an interventional device in each training image using semi-automatic shape registration; constructing ground truth data for the training images using the device segmentation maps; automatically adapting at least one of (i) a threshold to an imaging protocol for the deep learning algorithm, (ii) input data to the deep learning algorithm, or (iii) a parameter of the deep learning algorithm by training the deep learning algorithm using the ground truth data; acquiring a new test image showing the region of interest of the subject; and performing segmentation of the new test image including an interventional device using the adapted deep learning algorithm.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
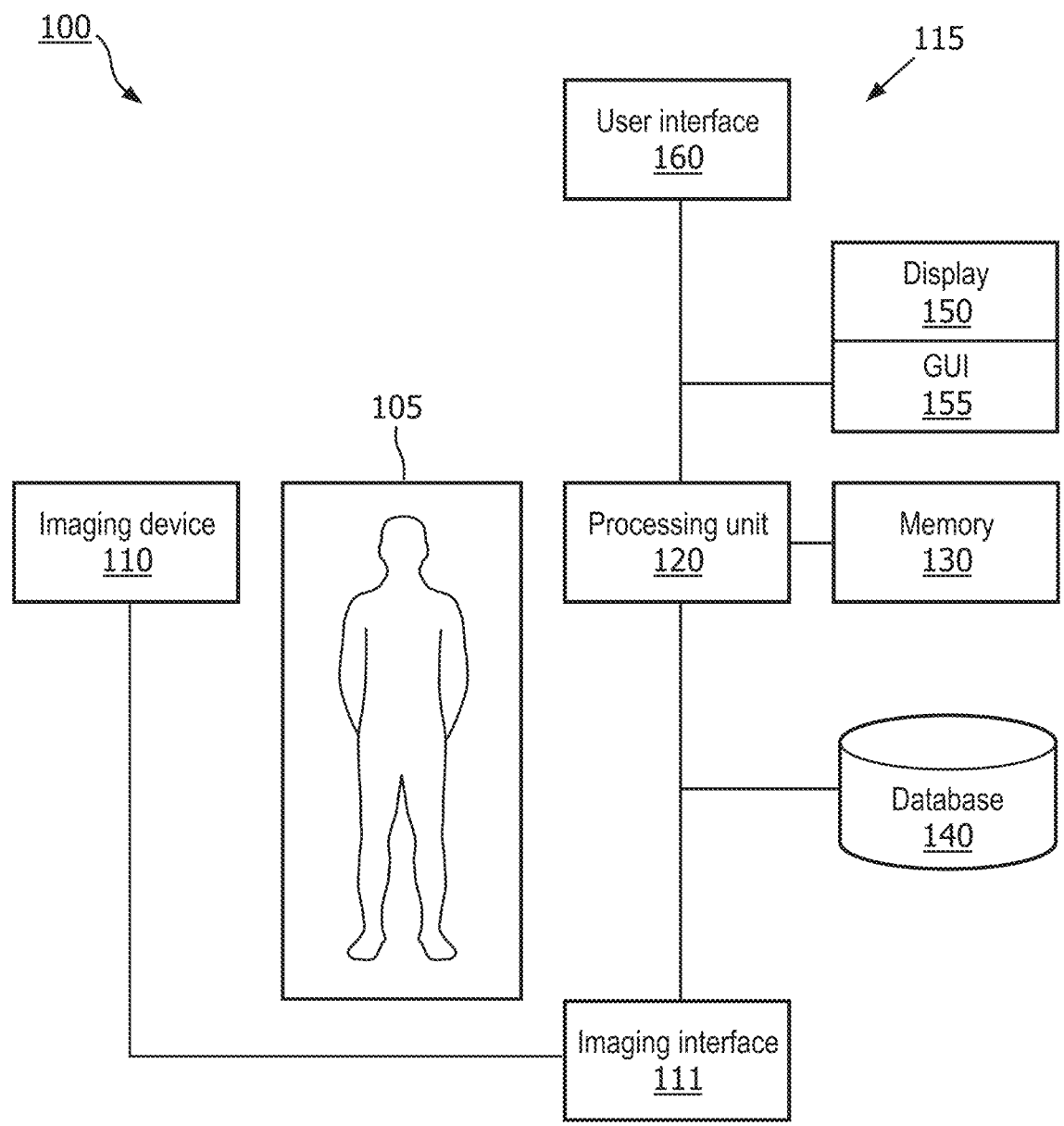
FIG. 1 is a simplified block diagram of a system for segmenting an image of a region of interest of a subject, according to a representative embodiment.

In the following detailed description, for the purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third, etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," "comprising," and/or similar terms specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

FIG. 1 is a simplified block diagram of a system for segmenting an image of a region of interest of a subject, according to a representative embodiment.

Referring to FIG. 1, an imaging system 100 includes an imaging device 110 and a computer system 115 for controlling imaging of a region of interest in a subject 105 (e.g., patient). The imaging device 110 may be any type of medical imaging device capable of providing images of the region of interest in the subject 105, including an x-ray imaging device, a CT scan imaging device, a magnetic resonance (MR) imaging device, an ultrasound imaging device, or a positron emission tomography (PET) scan imaging device, for example.

The computer system 115 receives image data from the imaging device 110, and stores and processes the imaging data according to the embodiments discussed herein. The computer system 115 includes a processing unit 120, a memory 130, a database 140 and a display 150. The processing unit 120 interfaces with the imaging device 110 through an imaging interface 111. The memory 130 stores instructions executable by the processing unit 120. When executed, the instructions cause the processing unit 120 to implement processes that include segmenting an image of a region of interest of a subject, and generating patches in an image of an interventional device for performing a deep learning image analysis of the image, described below with reference to FIGS. 2, 3, 5, 8, 9, 14, 16, 17 and 18, for example. In addition, the processing unit 120 may implement additional operations based on executing instructions, such as instructing or otherwise communicating with another element of the computer system 115, including the database 140, and the display 150 to perform one or more of the above-noted processes.

The processing unit 120 is representative of one or more processing devices, and is configured to execute software instructions to perform functions as described in the various embodiments herein. The processing unit 120 may be implemented by field programmable gate arrays (FPGAs), application specific integrated circuits (ASICs), a general purpose computer, a central processing unit, a computer processor, a microprocessor, a microcontroller, a state machine, programmable logic device, or combinations thereof, using any combination of hardware, software, firmware, hard-wired logic circuits, or combinations thereof. Additionally, any processing unit or processor herein may include multiple processors, parallel processors, or both. Multiple processors may be included in, or coupled to, a single device or multiple devices.

The term "processor" as used herein encompasses an electronic component able to execute a program or machine executable instruction. References to a computing device comprising "a processor" should be interpreted to include more than one processor or processing core, as in a multi-core processor. A processor may also refer to a collection of processors within a single computer system or distributed among multiple computer systems, such as in a cloud-based or other multi-site application. The term computing device should also be interpreted to include a collection or network of computing devices each including a processor or processors. Programs have software instructions performed by one or multiple processors that may be within the same computing device or which may be distributed across multiple computing devices.

The memory 130 may include a main memory and/or a static memory, where such memories may communicate with each other and the processing unit 120 via one or more buses. The memory 130 stores instructions used to implement some or all aspects of methods and processes described herein. The memory 130 may be implemented by any number, type and combination of random access memory (RAM) and read-only memory (ROM), for example, and may store various types of information, such as software algorithms, AI models including RNN and other neural network based models, and computer programs, all of which are executable by the processing unit 120. The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, blu-ray disk, a universal serial bus (USB) drive, or any other form of storage medium known in the art. The memory 130 is a tangible storage medium for storing data and executable software instructions, and is non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 130 may store software instructions and/or computer readable code that enable performance of various functions. The memory 130 may be secure and/or encrypted, or unsecure and/or unencrypted.

Similarly, the database 140 stores data and instructions used to implement some or all aspects of methods and processes described herein. The database 140 may be implemented by any number, type and combination of RAM and ROM, for example, and may store various types of information, such as software algorithms, AI models including RNN and other neural network based models, and computer programs, all of which are executable by the processing unit 120. The various types of ROM and RAM may include any number, type and combination of computer readable storage media, such as a disk drive, flash memory, EPROM, EEPROM, registers, a hard disk, a removable disk, tape, CD-ROM, DVD, floppy disk, blu-ray disk, USB drive, or any other form of storage medium known in the art. The database 140 is a tangible storage medium for storing data and executable software instructions and are non-transitory during the time software instructions are stored therein. The database 140 may be secure and/or encrypted, or unsecure and/or unencrypted.

"Memory" and "database" are examples of computer-readable storage media, and should be interpreted as possibly being multiple memories or databases. The memory or database may for instance be multiple memories or databases local to the computer, and/or distributed amongst multiple computer systems or computing devices.

The processing unit 120 may include or have access to an artificial intelligence (AI) engine, which may be implemented as software that provides artificial intelligence (e.g., an image segmentation algorithm) and applies machine learning described herein. The AI engine may reside in any of various components in addition to or other than the processing unit 120, such as the memory 130, the database 140, an external server, and/or the cloud, for example. When the AI engine is implemented in a cloud, such as at a data center, for example, the AI engine may be connected to the processing unit 120 via the internet using one or more wired and/or wireless connection(s). The AI engine may be connected to multiple different computers including the processing unit 120, so that the artificial intelligence and machine learning are performed centrally based on and for a relatively large set of medical facilities and corresponding subjects at different locations. Alternatively, the AI engine may implement the artificial intelligence and the machine learning locally to the processing unit 120, such as at a single medical facility or in conjunction with a single imaging device 110.

The interface 160 may include a user and/or network interface for providing information and data output by the processing unit 120 and/or the memory 130 to the user and/or for receiving information and data input by the user. That is, the interface 160 enables the user to enter data and to control or manipulate aspects of the processes described herein, and also enables the processing unit 120 to indicate the effects of the user's control or manipulation. The interface 160 may include one or more of ports, disk drives, wireless antennas, or other types of receiver circuitry. The interface 160 may further connect one or more user interfaces, such as a mouse, a keyboard, a mouse, a trackball, a joystick, a microphone, a video camera, a touchpad, a touchscreen, voice or gesture recognition captured by a microphone or video camera, for example.

The display 150 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 150 may also provide a graphical user interface (GUI) 155 for displaying and receiving information to and from the user.

Segmenting Image

Figure 2:
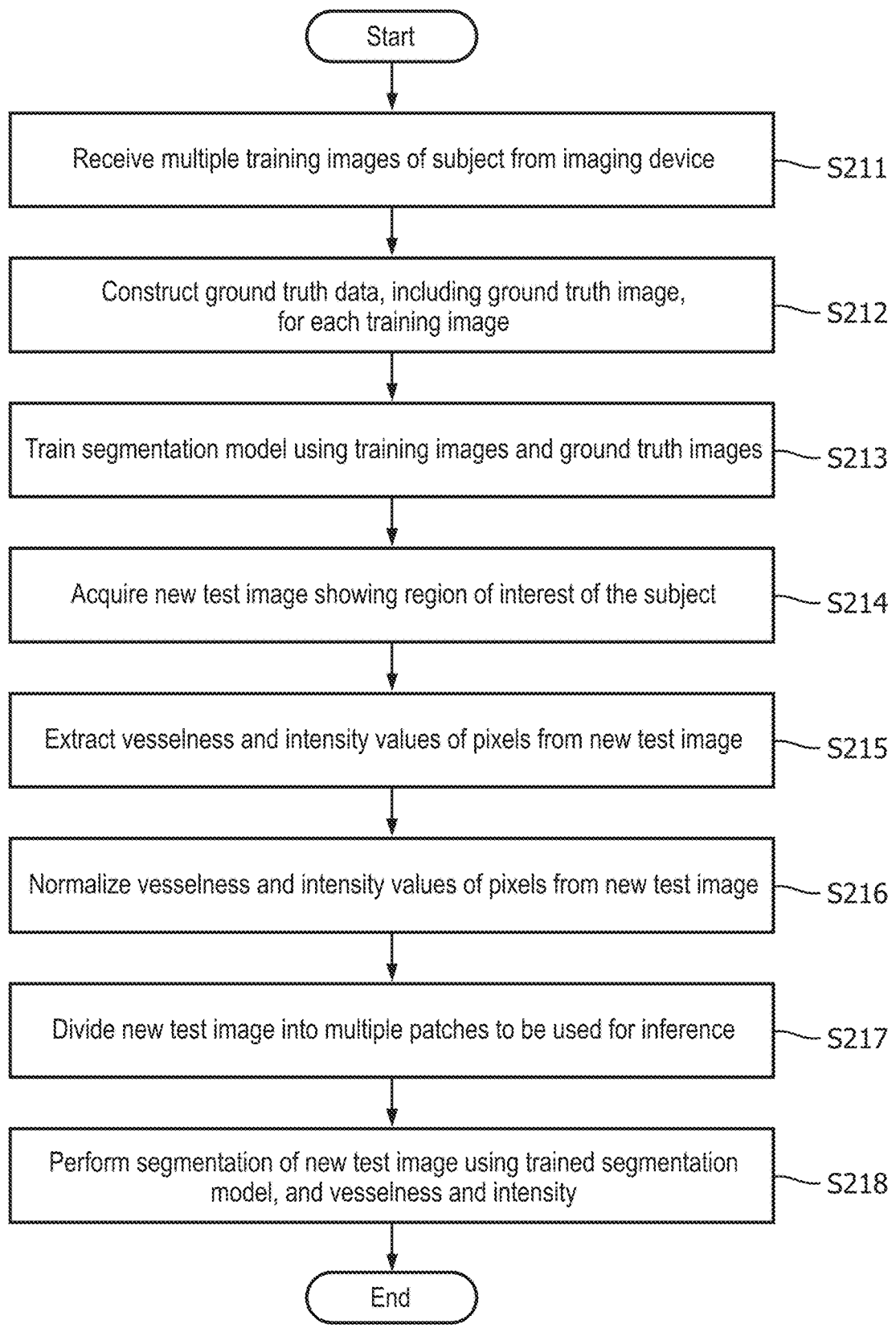
FIG. 2 is a simplified flow diagram showing a method of segmenting an image of a region of interest of a subject, according to a representative embodiment.

FIG. 2 is a flow diagram showing a method of segmenting an image of a region of interest of a subject, according to a representative embodiment. The method may be implemented by computer readable instructions or computer code, e.g., stored the memory 130 and executable by the processing unit 120, discussed above. For example, all or part of the method may be implemented by the AI engine, discussed above.

Referring to FIG. 2, the method includes receiving multiple training images of the subject at block S211. The training images may be live images received from an imaging device and/or previously obtained images from a database of training images. At least some of the training images include at least one training interventional device within the body of the subjection. The interventional device may be a guidewire, for example. There may also be training images of the subject's body with no interventional device pictured. The training images may by any of various types of medical images, such as x-ray images, CT images, MR images or ultrasound images, for example.

Block S212 indicates a process by which ground truth data, including at least a ground truth image, are constructed for each training image received in block S211. The ground truth data include the positions of one or more interventional devices of interest (if any) visible in the training image. The ground truth image is a binary image with a value of one for pixels showing an interventional device and a value of zero for the other pixels or objects in the training image. For training images that show at least one training interventional device in the subject, all pixels of the training interventional device must be identified in the training image in order to construct the ground truth data. (Notably, the descriptions of the embodiments herein reference image pixels; however, it is understood that the descriptions equally apply to image voxels, e.g., for three-dimensional images, without departing from the scope of the present teachings.) The training interventional device may be identified manually on the display of the training image, although identifying all of the pixels is time consuming and prone to mistakes. Alternatively, according to an embodiment, the interventional device is identified semi-automatically in the corresponding training image, enabling the ground truth construction for that training image.

Figure 3:
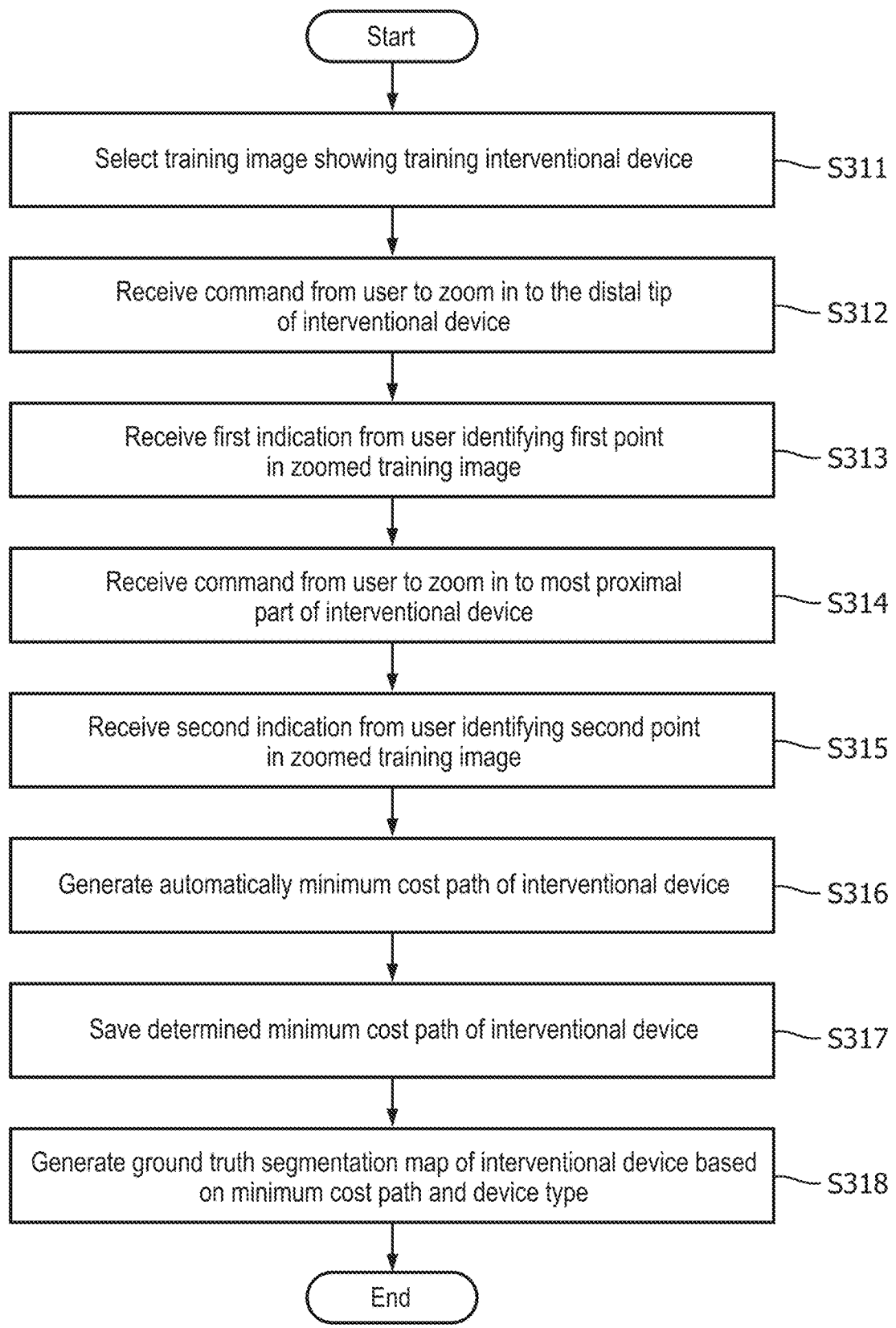
FIG. 3 is a simplified flow diagram showing a method of constructing ground truth data for each training image that includes at least one training interventional device, according to a representative embodiment.
Figure 4A:
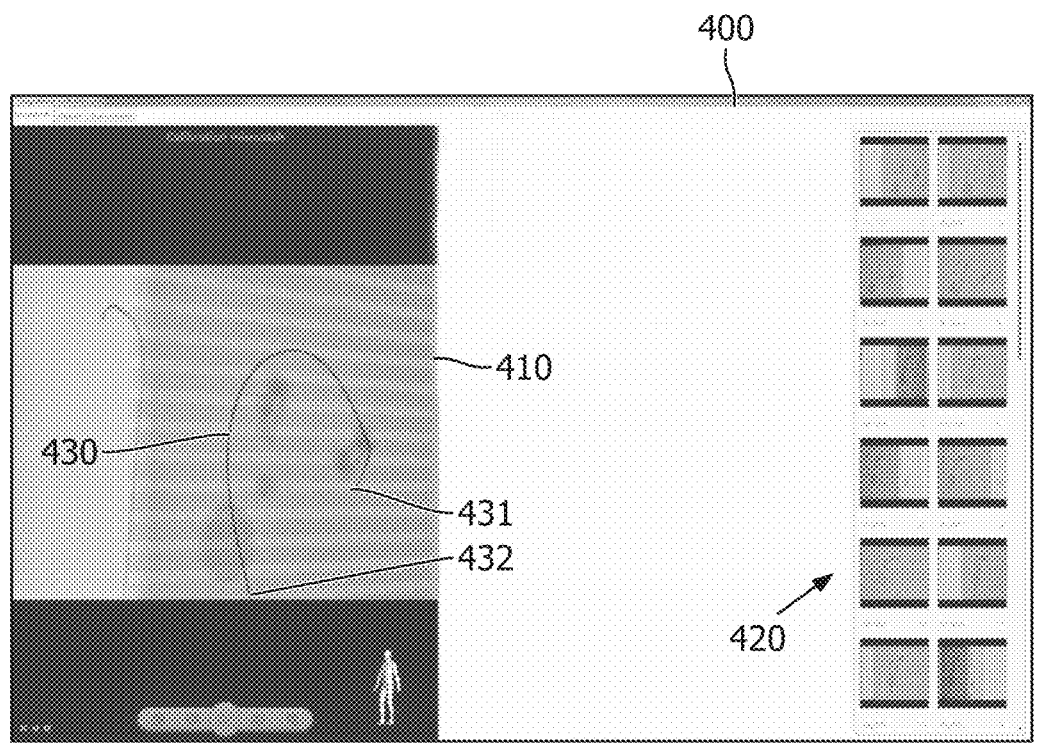
FIG. 4A is an illustrative display of a training image showing an interventional device, according to a representative embodiment.

In particular, FIG. 3 is a flow diagram showing a method of constructing ground truth data for each training image that includes at least one training interventional device, according to a representative embodiment. FIG. 4A is an illustrative display of a training image showing an interventional device, and FIG. 4B is an illustrative display of a training image showing a segmented interventional device, according to a representative embodiment.

Referring to FIG. 3, a training image showing an interventional device is selected and displayed on a display in block S311. FIG. 4A shows a representative training image 410 displayed on display 400. The training image 410 includes an interventional device 430 having a distal tip 431 and a most proximal part 432. The most proximal part 432 is the furthest portion of the interventional device 430 from the distal tip 431 that appears in the display 400. In the depicted embodiment, the training image 410 may be selected from group 420 of available training images that are displayed as thumbnails on the display 400. The thumbnails may be obtained from imaging runs, such as x-ray imaging runs, for example. The display 400 includes a graphical user interface (GUI) that enables a user to interact with the training image 410 and the group 420 of available training images to make selections, and to mark portions of the interventional device 430, discussed below.

In block S312, a command is received from the user (via the GUI) to zoom in to the distal tip 431 of the interventional device 430, and in block S313 a first indication is received from the user (via the GUI) identifying a first point 441 in the zoomed training image (not shown) corresponding to the distal tip 431. In block S314, another command is received from the user (via the GUI) to zoom in to the most proximal part 432 of the interventional device 430, and in block S315, a second indication is received from the user (via the GUI) identifying a second point 442 in the zoomed training image (not shown) corresponding to the most proximal part 432. The zooming is performed in a known manner, and enables the user to more precisely identify the exact locations of the distal tip 431 and the most proximal part 432. The first and second points 441 and 442 are shown in FIG. 4B.

Figure 4B:
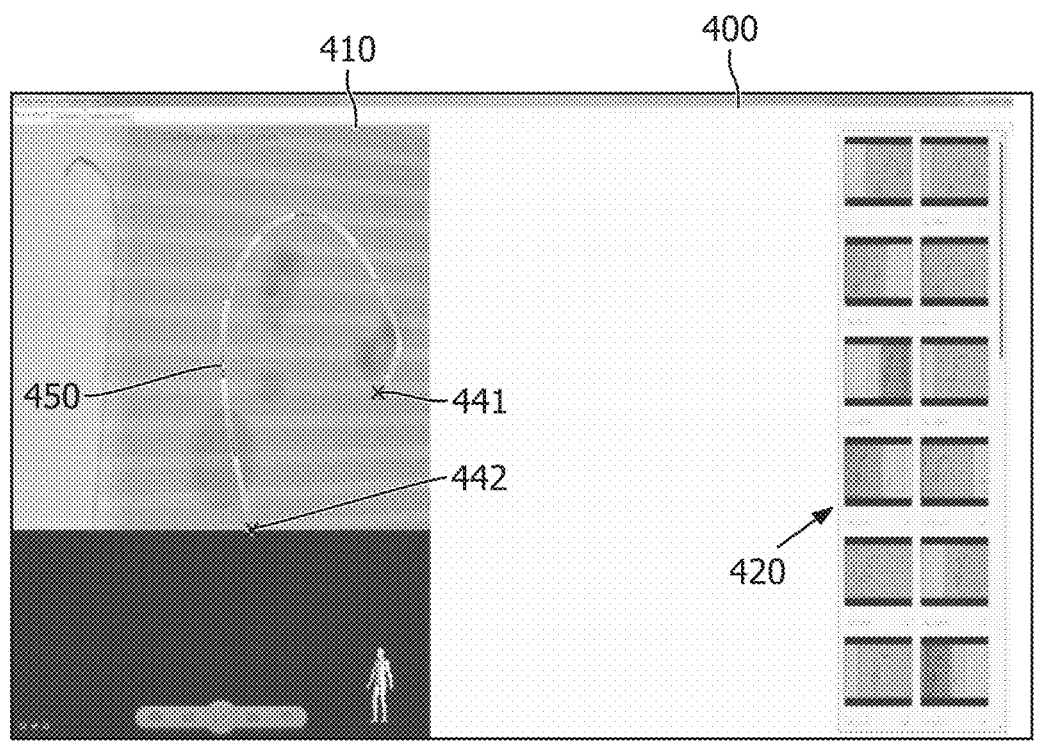
FIG. 4B is an illustrative display of a training image showing a segmented interventional device, according to a representative embodiment.

In block S316, a minimum cost path 450 of the interventional device 430 is generated automatically between the first point 441 and the second point 442 after identification of the second point 442 using a ground truth algorithm, as shown in FIG. 4B. In particular, the minimum cost path 450 is determined according to a cost function, e.g., based on vesselness strength at each pixel of the training image 410 and path orientation. That is, the cost is a function of device similarity of the pixels, where the minimum cost path follows the image of the interventional device 430 and results in a corresponding segmentation map. An example of a cost function that may be used for determining the minimum cost path is the known Frangi vesselness filter, which measures elongatedness of the region around each pixel in the image. That is, the Frangi vesselness filter is an enhancement filter used to enhance contrast of elongated structures with respect to background. For example, the cost of each of the pixels may be a weighted summation of an inverse of the measured elongatedness value and a difference in the path orientations between path points, so that the minimum cost path follows the interventional device 430 in the training image as smoothly as possible. The Frangi vesselness filter is described, for example, by Frangi et al., "Multiscale vessel enhancement filtering," *LNCS, vol.* 1496, pages 130-137 (Germany, 1998) (Springer-Verlag), which is hereby incorporated by reference in its entirety.

Accordingly, beginning at the first point 441 and working toward the second point 442, the minimum cost path 450 highlights the pixels that correspond to the interventional device 430. The cost function measures vesselness strength at each pixel or voxel, beginning at the first point 441, and compares it to the vesselness strength of the immediately surrounding pixels. The vesselness strength is higher for more elongated pixels. The cost function identifies a next pixel from among the immediately surrounding pixels or that best matches the vesselness strength at the first point 441, and then repeats the comparison process for the immediately surrounding pixels of the identified next pixel. This process is repeated until the cost function reaches the second point 442, where the identified and highlighted pixels provide the minimum cost path 450. The user may zoom out to show the entire minimum cost path 450, and to verify that it has been extracted accurately to represent of the interventional device 430.

Upon verification, the determined minimum cost path 450 of the interventional device 430 is saved in block S317, along with a device type corresponding to the training interventional device 430. The various devices types may include a guidewire, a catheter, a needle, and an endoscope, for example. In block S318, a ground truth segmentation map of the interventional device 430 is generated based on the determined minimum cost path 450 and the device type, and displayed as a ground truth image. That is, the points of the determined minimum cost path 450 (e.g., ground truth data) are used to create the binary ground truth image, as discussed above. The ground truth segmentation map of the interventional device 430 is also saved. The process may be repeated for the next imaging run. When the training image does not include an interventional device, there is no minimum cost path, and thus the corresponding ground truth image has zero values for all pixels.

When the minimum cost path does not follow the interventional device 430, the user may add another device point (while still zoomed in) at the closest location along the interventional device 430 in the training image at which the cost path is still accurate, beginning at the first point 441. The user may then add another device point at another nearby location along the interventional device 430 where the cost path is still accurate, and continue this process until the entire interventional device 430 is accurately segmented. The ground truth algorithm determines the minimum cost path 450 between each set of two consecutive device points, and combines these paths to determine the ground truth segmentation map. Again, the resulting minimum cost path 450 may be saved as the ground truth segmentation map.

Figure 5:
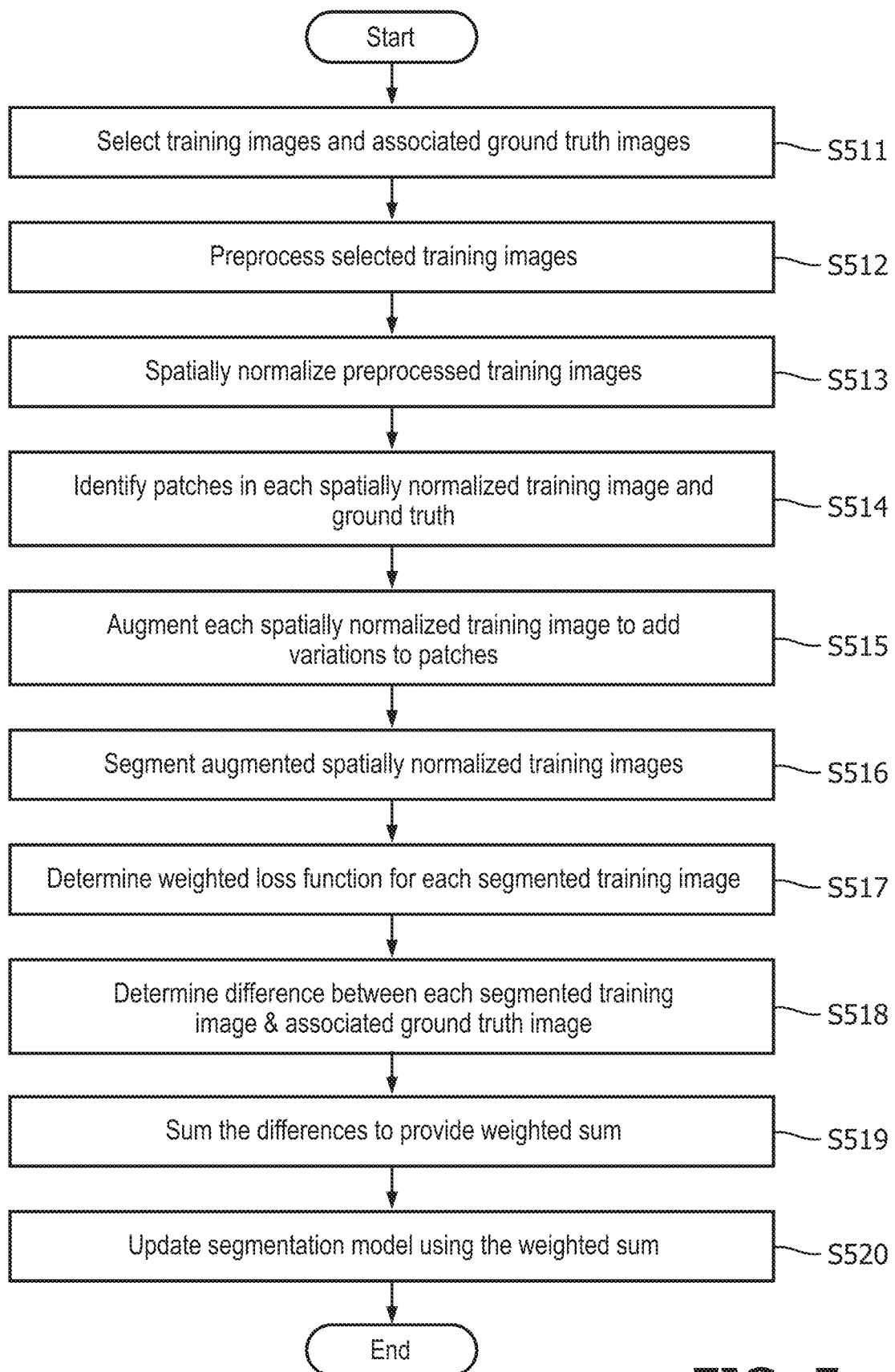
FIG. 5 is a simplified flow diagram showing a method of training a segmentation model, according to a representative embodiment.

Referring again to FIG. 2, block S213 indicates a process by which a segmentation model is trained using the training images based on intensity and vesselness features in the training images and based on the ground truth images (e.g., ground truth segmentation maps) determined in block S212 associated with the training images. The segmentation model may be referred to as a deep learning algorithm. FIG. 5 is a flow diagram showing a method of training a segmentation model, according to a representative embodiment. The segmentation model architecture may be any compatible architecture, such a variation of U-net architecture, for example, as would be apparent to one skilled in the art. An example of the U-net architecture that has been successfully used for medical image segmentation is described by O. Ronneberger et al., "U-Net: Convolutional Networks for Biomedical Image Segmentation," *MICCAI* (2015), which is hereby incorporated by reference in its entirety.

Referring to FIG. 5, in order to train the segmentation model, the training images and the associated ground truth images are selected in block S511, which may be the same training images used to generate the ground truth segmentation maps, discussed above.

In block S512, the selected training images are preprocessed. Generally, features of the training images may be provided by two channels as input, where a first channel is intensity and a second channel is vesselness, as extracted from the Frangi's filter, for example. The use of vesselness for device segmentation in addition to intensity improves the segmentation performance, especially with regard to the detection at the distal tip.

The preprocessing of the selected training images includes normalizing intensity and vesselness features of the selected training images. For example, a mapping operation may be performed on each of the intensity channel and the vesselness channel to remove outliers in each of the selected training images. The mapping operation incudes mapping an intensity range of the intensity channel to a predefined standard intensity range. The intensity range is determined by sorting the intensity values of the intensity channel and mapping the intensity values at predetermined percentiles to a standard intensity range. The mapping operation further incudes mapping a vesselness range of the vesselness channel to a predefined standard vesselness range. The vesselness range is determined by sorting the vesselness values of the vesselness channel and mapping the vesselness values at predetermined percentiles to a standard vesselness range. Each of the mapped intensity channel and the mapped vesselness channel is normalized using statistics from the training dataset to have zero mean and unit standard deviation. Thus, the preprocessed training images include the normalized intensity and vesselness features. In an embodiment, the predetermined percentiles for determining the intensity values and the vesselness values may be 0.5 or 99.5, and each of the standard intensity range and vesselness range is [0,1].

In block S513, the preprocessed training images are spatially normalized, so that the preprocessed training images and the associated ground truth images have the same pixel resolution. That is, each of the mapped intensity channel and the mapped vesselness channel are normalized using statistics from the whole training dataset to have zero mean and unit standard deviation.

In block S514, a plurality of patches are identified in each spatially normalized training image and the associated ground truth image along a portion of the spatially normalized training image showing the interventional device 430. Each patch of the multiple patches has the same number of pixels. In block S515, each spatially normalized training image is augmented to add variations to the patches in the spatially normalized training image and the associated ground truth image. The spatially normalized training images may be augmented using zooming, rotation, noise addition, local contrast reduction or expansion, flipping, mirroring, and transposing training data in the training image, for example, which are well known by those skilled in the art of image segmentation and artificial intelligence.

In blocks S516-S520, the segmentation model is trained using the augmented spatially normalized training images. In particular, each augmented spatially normalized training image is segmented in block S516, and a weighted loss function of binary cross entropy and/or a variant of Jaccard coefficient is determined for each segmented training image in block S517. For example, the loss function may be determined using a combination of binary cross entropy and a variant of the well known Jaccard coefficient. In this case, the values from all interventional device pixels (e.g., corresponding to the interventional device 430) are calculated for the Jaccard coefficient. Additionally, a local Jaccard coefficient may be determined for the distal tip region in the neighborhood of the distal tip (e.g., distal tip 435) of the interventional device 430, since segmentation accuracy at the distal tip 435 is particularly important. Therefore, the weighted loss function would favor (more heavily weight) the Jaccard coefficients at or near the distal tip.

In block S518, the differences between each segmented training image, or patches in each segmented training image, and the ground truth image associated with the segmented training image is determined using the weighted loss function determined in block S517. For the plurality of training images, this determined difference between each segmented training image, or patches in each segmented training image, and the ground truth image associated with the segmented training image are summed to provide a weighted sum in block S519. The segmentation model is then updated using the weighted sum in block S520, thereby training the segmentation model.

In an embodiment, training the segmentation model may further include identifying a valid region in each training image, where the each valid region includes a rectangular border. In this case, identifying the plurality of patches in each spatially normalized training image includes identifying at least some of the patches at the rectangular borders of the valid regions, respectively. For example, assuming x-ray imaging for purposes of illustration, each of the training images has region-of-interest (ROI) rectangle information that indicates the imaged rectangular region, referred to herein as the valid region. Pixels located outside the valid region may have some fixed value, which is determined based on the imaging protocol and the x-ray imaging device. The rectangular border of the valid region may sometimes be mistaken as the interventional device because of its sharp contrast, which may result in a large number of false indications of the interventional device. To prevent such false indications, according to an embodiment, some of the patches may be chosen at the rectangular border of the valid region in order to include this type of transition in the data set. Thus, identifying the plurality of patches in each training image includes identifying some of the patches at the rectangular border of the valid region. Choosing the patches at the rectangular border of the valid region reduces the number of false indications considerably.

As an example of training the segmentation model, 200 x-ray images were obtained from multiple subjects as an image dataset for purposes of demonstration. During training, a first subset of 80 images was designated for training, a second subset of 40 images was set apart for validation, and a third subset of the remaining 80 images (excluded from training) was considered for testing. To guarantee that there would be no data leakage among the first, second and third subsets, the images from a subject of interest can only be in one of the subsets. The 80 training images were spatially normalized to be used for training. When the 80 training images had different pixel resolutions, they were first spatially normalized, e.g., block S513, to the same physical pixel size (e.g., 0.37 mm). Accordingly, the training images with higher resolution (i.e., having physical pixel sizes less that the normalized pixel size) were down-sampled to match the lower resolution images.

Each of the 80 spatially normalized training images was divided into patches formed of a selected number of pixels, e.g., block S514. For example, each patch may be chosen to have a size of 256×256 pixels. As discussed above, identifying the plurality of patches in each spatially normalized training image includes identifying at least some of the patches at rectangular borders of a valid region in each of the training images. Pixels located outside the valid region have some fixed value, which is determined based on the imaging protocol and the x-ray imaging device. To prevent false indications, some of the patches were chosen at the rectangular border of the valid region in order to include this type of transition in the data set. Thus, identifying the plurality of patches in each training image included some of the patches being identified at the rectangular border of the valid region, thereby reducing the number of false indications, as discussed above.

Because the patches may be selected at any point in a training image, translation-invariance is inherently part of the training. Translation-invariance means that, when an interventional device appears in a different place in the image (translation), it will still be detected. So, segmentation performance does not vary with the translation. Part of selecting the patches considers the ratio of interventional device pixels in the selected patch to the background (or non-object) pixels in the selected patch. Because the number of background pixels far exceeds the number of interventional device pixels, the percentage of the patches with interventional device pixels is actively monitored.

In the example above, the segmentation model was trained by selecting 100,000 patches for training of the designated 80 training images, and 20,000 patches for validation of the designated 40 validation images. In an embodiment, the learning rate of the segmentation model may be adjusted. For example, a learning rate finder technique may be used for adjusting the learning rate. The learning rate per iteration may be set based on the one-cycle training paradigm well known to one skilled in the art, examples of which are provided by L. Smith, "Cyclical Learning Rates for Training Neural Networks," *WACV* (2017), and L. Smith, "A disciplined approach to neural network hyper-parameters: Part 1—learning rate, batch size, momentum, and weight decay," US Naval Research Lab Technical Report 5510-26 (2018), which are hereby incorporated by reference in their entireties. An intuitive learning rate finder has been proposed, where a range of learning rate is first determined and the segmentation model is trained for one or more batches for each possible learning rate in the determined range. The loss is determined for each tested learning rate. Because the training per learning rate is performed for one or more batches (typically very few samples from training set, such as 4 to 64 samples) instead of an epoch (full training set), the computations are quickly completed. Then, based on analysis of a plot of the loss values by the learning rate, the maximum learning rate can be determined. Typically, analysis to find the maximum learning rate that results in a decrease in the loss is based on visual estimation. Alternatively, an automatic method can be devised by computing the minimum of the loss or by finding the valley in the loss-learning rate plot, and taking the learning rate corresponding to that loss value as the maximum learning rate. From this maximum, a cyclical learning rate by the number of epochs can be created. After finding the maximum learning rate and given number of epochs to train the segmentation model, the one cycle paradigm sets the learning rate per epoch of training. One way to compute the one cycle is to start the epochs with one tenth of the maximum learning rate and linearly increase the learning rate to the determined maximum learning rate at half of the epochs, and then linearly decrease back to one tenth in the second half of the epochs to create a triangularly shaped plot. In this way, the training starts with slow learning rates and gradually increases to the higher, maximum learning rate and then decreases to slow learning rates towards the end of the training. Training of the segmentation model for around 120 epochs results in good segmentation performance, where an epoch refers to one cycle through the full training dataset.

Referring again to FIG. 2, in block S214, a new test image is acquired showing the region of interest of the subject. The new test image may be a newly acquired image of the subject using the same (or same type) imaging device used to obtain the training images, or may be selected from among the thumbnail images of the group 420 that were not selected for training or authentication, discussed above. The segmentation model may be used to extract the interventional device 430 in the new test image, discussed below. Although segmentation of one new test image is described herein for purposes of illustration, it is understood that the process may be performed on multiple new test images, without departing from the scope of the present teachings.

In block S215, vesselness values and intensity values of pixels are extracted from the new test image. The new test image may or may not include one or more interventional devices. The vesselness values and the intensity values are used to identify the one or more interventional devices in the new test image, if any. The extracted vesselness values and intensity values of the pixels in the new test image are normalized in block S216.

In block S217, the new test image is divided into multiple patches to be used for inference. In particular, like the training images, the new test image has a rectangular valid region, which is tessellated by square patches (e.g., 256×256 pixels), starting from an uppermost pixel in the valid region.

A parameter stride length is then set, where the parameter stride length determines the size of the translation between the patches. For example, when the patches are 256×256 pixels, a parameter stride length of 256 results in no overlap between two consecutive patches, and a parameter stride length of 128 results in half of each patch overlapping with a patch to one side (e.g., left) or above.

In block S218, segmentation of the new test image is performed using the trained segmentation model to generate a segmentation image that corresponds to the new test image, as well as vesselness and intensity of the pixels of the new test image. The segmentation image has values indicating for each pixel in the segmentation image a presence or an absence of at least one interventional device. The segmentation image provides an accurate, identifiable position of the at least one interventional device in the new test image. The position of the at least one interventional device is used to enable or improve any of various applications that use interventional device positions, such as image registration, visualization, segmentation and high-level scene understanding, for example.

For each patch in the segmentation image, after vesselness and intensity value normalization, the segmentation model that was trained according to the process of block S213 is applied to segment the new test image. For each (input) patch that is processed by the segmentation model, an output patch is obtained having the same size as that input patch. The resulting output patches are stored as an image at the same pixel locations as the corresponding input patches. When a location has already been processed, the new segmentation response values for the batch are added to the existing segmentation response values for that location. A counter image is also stored at the same time. The main functionality of the counter image is to count how often a pixel is processed by the segmentation model. To normalize the detection result, the resulting segmentation image is pointwise divided by the counter image. This process averages the overlapping patch responses to compute a response image. The response image is thresholded at zero to get a segmentation map of interventional device(s) in the new test image, which is a process that may be referred to as in deep learning terminology as "inference." Alternatively, the response image is computed by taking the maximum response per pixel for the overlapping patches. Similar to the averaging case, the response image is thresholded at zero to get the segmentation map.

In an example, a new test image shows two illustrative interventional devices that run substantially vertically through the new test image. The interventional devices may be guidewires, for example. A segmented test image is determined by segmenting the new test image, according to a representative embodiment discussed herein. The segmented test image shows the two illustrative interventional devices after segmentation, which are substantially aligned with the interventional devices shown in the new test image.

When compared with segmentation results of a conventional, threshold-based segmentation algorithm based on vesselness, the segmentation results according to a representative embodiment discussed herein are significantly better. For example, the sensitivity rate with the baseline conventional segmentation method is 24 percent, while the sensitivity rate of the segmentation method according to the disclosed embodiments is 83 percent. The much lower percentage rate of the conventional segmentation method is primarily caused by many false positives, resulting in segmentation of non-device pixels as device pixels.

Generating Patches

Image patches are commonly utilized as the basic processing unit for deep learning algorithms in image analysis. Generally, patches reduce the amount of data needed for training the deep learning algorithm, provide built-in translation invariance, and allow for flexibility in inference times. However, because patches are the operating units, a very large number of patches must be processed per image, which reduces inference time. Also, patch-based processing has a high computational cost because of the large number of patches that must be analyzed to generate results robust to translation and rotation.

The disclosed embodiments provide a fast filter method that reduces the number of regions from which to select patches for a deep learning algorithm. Generally, the number of patches used for image analysis of two- or three-dimensional images is significantly reduced by selecting the most informative patches adaptive to the content of the image. The patch selection is based on detection of key points, where only patches corresponding to the detected key points are generated. The method improves inference speed up to four times for guidewire segmentation, for example. Multi-dimensional features, such as vesselness and/or intensity, may be used to select the patches.

Referring again to FIG. 2, in block S216, the new test image is divided into multiple patches to be used for inference. The patches may be determined according to the embodiments below. In particular, FIG. 6 is a simplified flow diagram showing a method of generating multiple patches in a new test image showing an interventional device, according to a representative embodiment.

Figure 6:
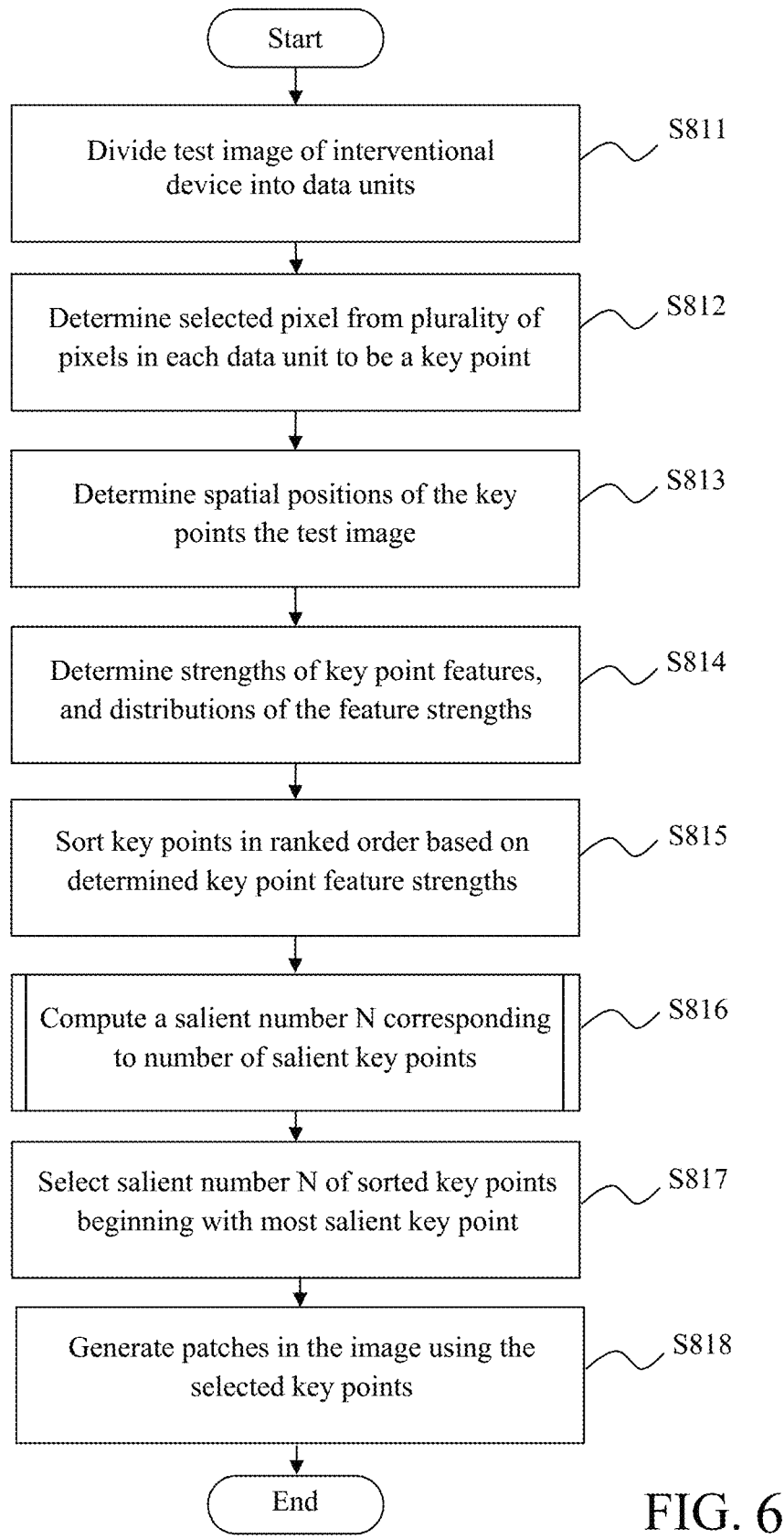
FIG. 6 is a simplified flow diagram showing a method of generating patches in an image of an interventional device in a region of interest of a subject, according to a representative embodiment.

Referring to FIG. 6, a test image of the interventional device is divided into a plurality of data units in block S811. These data units may be overlapping or non-overlapping. As mentioned above, the test image is assumed to be a two-dimensional image (with pixels) for purposes of illustration, in which case the data units are blocks with a predetermined width and height. In an alternative embodiment, the test image may be a three-dimensional image (with voxels), in which case the data units are boxes with a predetermined width, height and depth. Again, although the method of FIG. 6 is described here referencing pixels, it is understood that the descriptions equally apply to voxels, without departing from the scope of the present teachings.

In block S812, a selected pixel is determined from among the plurality of pixels in each data unit to be a key point corresponding to the data unit. The key point may be determined by applying an operation to determine a rank order of the pixels in the data unit based on a feature, and then selecting the highest ranking pixel in the determined rank order as the key point. Notably, the highest ranking pixel is the pixel displaying the most salient feature, which may correspond to the highest or lowest value of that feature. The feature on which rank order is based may be vesselness or intensity, for example. When the feature is vesselness, the operation to determine the rank order of the pixels is a maximum operation, so that the pixel within each data unit with a highest vesselness value (most elongated) is the highest ranking pixel and is determined to be the key point in that data unit. When the feature is intensity, the operation to determine the rank order of the pixels is a minimum operation, so that the pixel within each data unit with a lowest intensity value (darkest) is the highest ranking pixel and is determined to be the key point in that data unit. Alternatively, the feature on which rank order is based may be a deep learning algorithm result. For example, the segmentation model may be quantized to use 8-bit or 16-bit weights, in which case the quantized segmentation model will be less accurate than the actual segmentation model (with 32-bit floating point weights), but will be faster. This faster 8-bit or 16-bit weight version may be applied to the test image and the response may be used to determine key points to run the actual segmentation model.

The maximum operation comprises selecting an initial pixel at a predetermined starting point (e.g., a corner pixel), and comparing the vesselness value of the pixel with that of an adjacent pixel to determine the larger vesselness value. The pixel with the larger vesselness value is then compared to a next adjacent pixel to determine the larger vesselness value, and so on until all of the vesselness values have been compared and the highest vesselness value (and corresponding pixel) has been identified. During this operation, the spatial position of the pixel with the maximum value is also stored to use at a later time. Likewise, the minimum operation comprises selecting an initial pixel at a predetermined starting point, and comparing the intensity value of the pixel with that of an adjacent pixel to determine the smaller intensity value. The pixel with the smaller intensity value is then compared to a next adjacent pixel to determine the smaller intensity value, and so on until all of the intensity values have been compared and the smallest intensity value (and corresponding pixel) has been identified. During this operation, the spatial position of the pixel with the minimum value is also stored to use at a later time.

Once the key points of the data units have been determined, the spatial positions of the key points in the test image are determined in block S813. The spatial positions are the positions that have been stored while performing the rank-order operation as explained above.

In block S814, strengths of the features of the key points in the test image are determined, as well as distributions of the determined feature strengths. Again, the feature strengths may be vesselness strengths (e.g., calculated as part of a Frangi vesselness filter, discussed above) or intensity strengths (e.g., intensity value obtained from the test image) of the pixels corresponding to the key points, for example. In block S815, the key points are sorted in a ranked order from most salient to least salient based on the corresponding feature strengths of the key points determined in block S814.

Block S816 indicates a process by which a value of salient number N is computed, where the salient number N is the number of salient key points in the test image that will be used to generate patches. The value of the salient number N may be computed using the determined spatial positions of the key points from block S813, and the determined feature strengths of the key points and the determined distributions of the determined feature strengths of the key points from block S814. For example, the value of the salient number N may be computed automatically by plotting a histogram of key point feature strengths, discussed below with reference to FIGS. 9 and 10. In an alternative embodiment, the salient number N may be predetermined, although using a predetermined salient number N may provide less accurate results, depending for example on the number of interventional instruments to be identified in the test image, where more interventional instruments typically require higher values of N.

Figure 7:
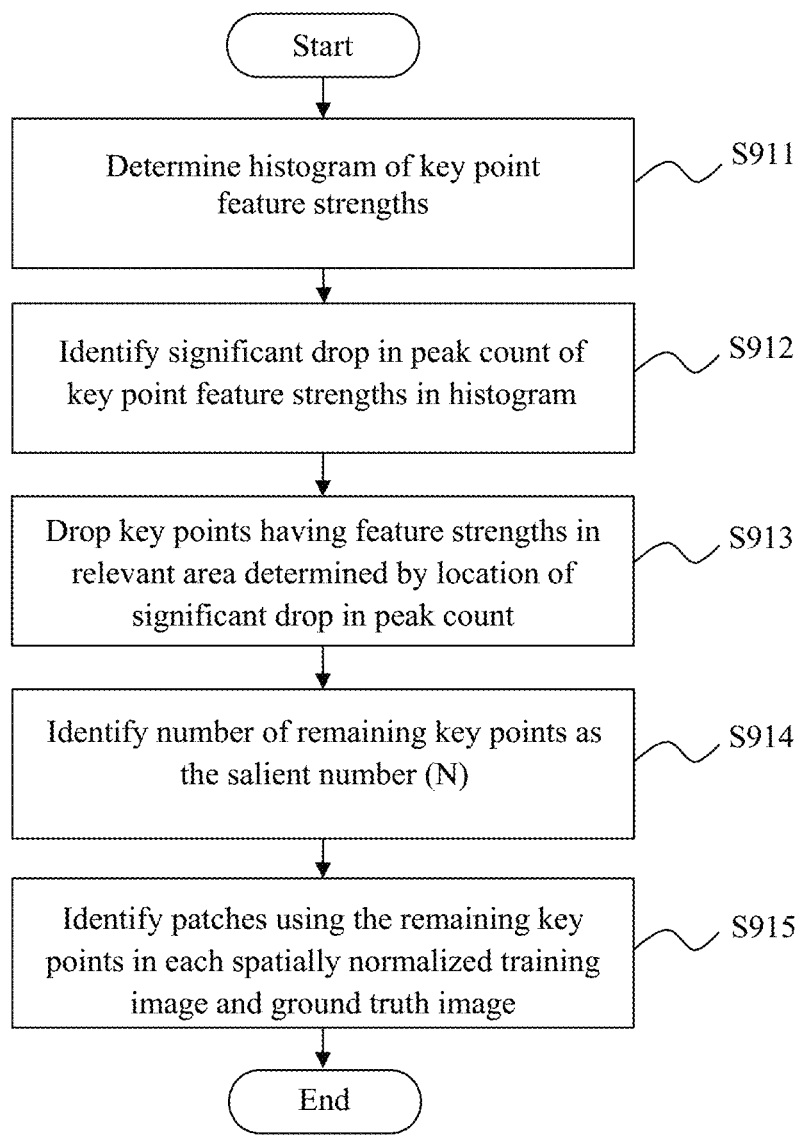
FIG. 7 is a simplified flow diagram showing a method of automatically determining the value of salient number N, according to a representative embodiment.
Figure 8:
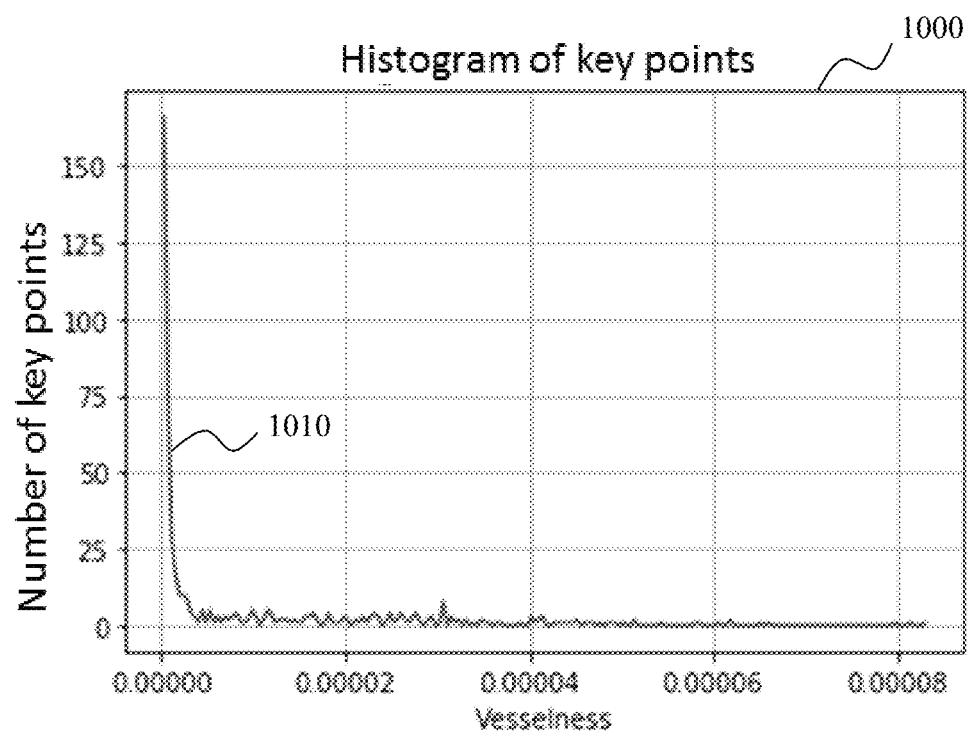
FIG. 8 is a graph showing an example of a histogram of feature strengths of key points in a test image, according to a representative embodiment.

FIG. 7 is a simplified flow diagram showing a method of automatically determining the value of salient number N, according to a representative embodiment. FIG. 8 is a graph showing an example of a histogram of feature strengths of key points in a test image, according to a representative embodiment.

Referring to FIG. 7, a histogram of the feature strengths of the key points is determined in block S911. In FIG. 8, the feature of the key points on which histogram 1000 is based is vesselness, although it is understood that a histogram may likewise be determined using intensity. The horizontal axis of the histogram 1000 provides vesselness value strength and the vertical access provides the number of key point candidates having a given vesselness value. Curve 1010 shows that most of the image does not have an interventional device because there are many key points with low vesselness values. The selected salient key points will be the ones that have vesselness values above the determined threshold value.

In block S912, a significant drop is identified in a peak count of the determined vesselness strengths of the key points in the histogram 1000, indicating fewer pixels having the higher vesselness values. In block S913, the key points having determined vesselness strengths in the relevant area are not used for patch generation. The relevant area is the region where the peak occurs, and may be determined by a location of the significant drop in the peak count. For vesselness, the relevant area is to the right of the significant drop on the horizontal axis (meaning key points with higher vesselness values are selected for patch generation), while if intensity were used, the relevant area would be to the left of the significant drop (meaning key points with lower intensity values are selected for patch generation). The number of remaining key points is identified in block S914 as the salient number N. In block S915, patches are identified using the remaining key points in each spatially normalized training image and ground truth image.

Figure 9A:
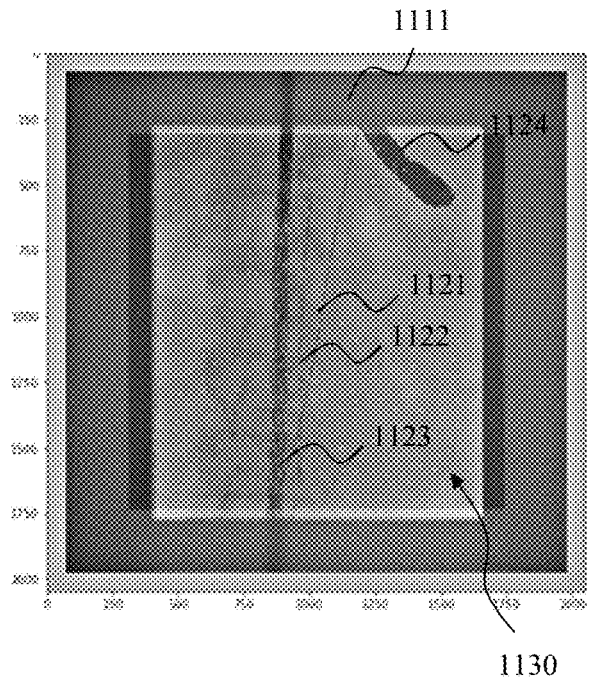
FIG. 9A is an illustrative display of a test image with key points calculated from the intensity feature, according to a representative embodiment.
Figure 9B:
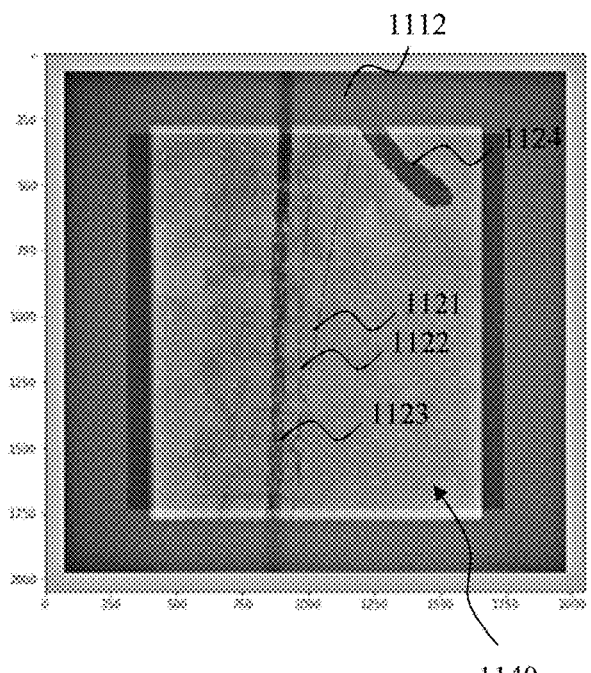
FIG. 9B is an illustrative display of a test image with key points calculated from the vesselness feature, according to a representative embodiment.

FIG. 9A shows a new test image with key points calculated from the intensity feature, and FIG. 9B shows a new test image with key points calculated from the vesselness feature. For purposes of comparison, FIG. 10A shows a new test image with a salient number of key points calculated from the intensity feature, and FIG. 10B shows a new test image with a salient number of key points calculated from the vesselness feature, according to representative embodiments.

Referring to FIG. 9A, a test image 1111 is an x-ray image showing three representative interventional devices, including a guidewire 1121, a catheter 1122, a stent 1123, and a transesophageal echocardiogram (TEE) probe 1124, and in a region of interest of the subject. The test image 1111 further shows key point locations 1130, indicated by dots, for key points calculated from the intensity feature in 64×64 data units (blocks). FIG. 9B shows an x-ray test image 1112 also showing the guidewire 1121, the catheter 1122, the stent 1123, and the TEE probe 1124 in the region of interest. The test image 1112 further shows key point locations 1140, indicated by dots, for key points calculated from the vesselness feature in 64×64 data units. In the depicted example, there are 398 key point locations 1130 and 1140 in both of the test images 1111 and 1112.

Figure 10A:
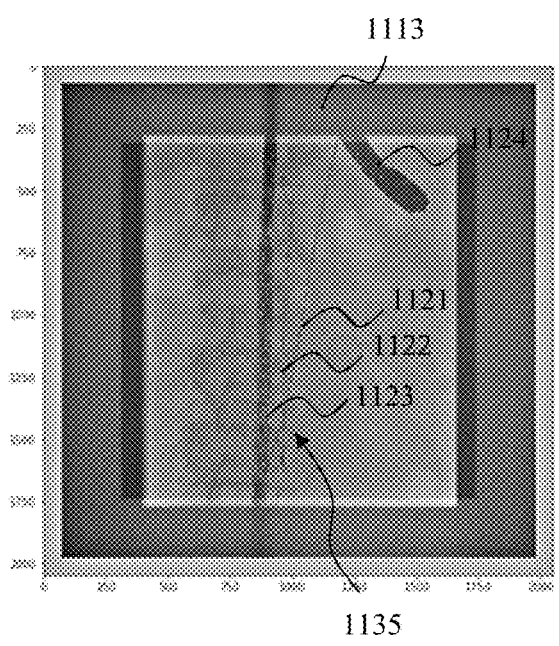
FIG. 10A is an illustrative display of a test image with a salient number of key points calculated from the intensity feature, according to a representative embodiment.
Figure 10B:
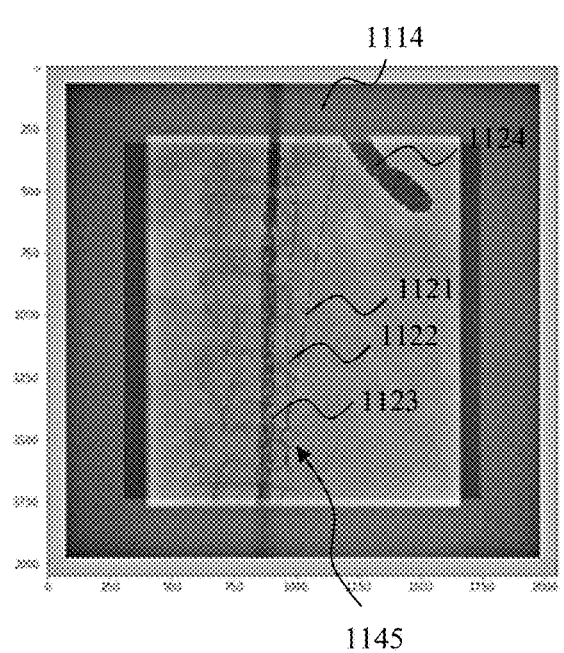
FIG. 10B is an illustrative display of a test image with a salient number of key points calculated from the vesselness feature, according to a representative embodiment.

In comparison, FIGS. 10A and 10B show x-ray test images 1113 and 1114 including the guidewire 1121, the catheter 1122, the stent 1123, and the TEE probe 1124 in the region of interest of the subject. The test image 1113 in FIG. 10A further shows key point locations 1135, indicated by dots, for a salient number of key points calculated from the intensity feature in 64×64 data units, according to a representative embodiment. The test image 1114 in FIG. 9B further shows key point locations 1145, indicated by dots, for a salient number of sorted key points calculated from the vesselness feature in 64×64 data units, according to another representative embodiment. In the depicted example, there are only 99 key point locations 1135 and 1145 in the test images 1113 and 1114, respectively. Therefore, using either the intensity or vesselness features, use of the salient number of sorted key points provides a four-fold increase in efficiency. Notably, the key point locations 1135 and 1145 are mostly accumulated over the images of the guidewire 1121, the catheter 1122, the stent 1123, and the TEE probe 1124, so no data is lost as a practical matter with regard to identifying these interventional instruments.

Referring again to FIG. 6, the salient number N of the sorted key points are selected in block S817, beginning with the most salient key point, which are arranged in the ranked order. For example, if it is determined in block S816 that N=50, the 50 highest ranked key points are selected in order from among the key points arranged in the ranked order. In block S818, patches are generated in the test image using only the N selected key points. For example, if N=50, only 50 patches are generated for the test image. The unselected key points are effectively ignored when generating the patches.

The patches corresponding to the selected (most salient) key points may be placed in the test image by various techniques. For example, in an embodiment, a patch for each of the selected key points is placed by setting the patch center as the key point location. However, this may generate more patches than necessary. In another embodiment, patches are generated for the region of the test image covered by the selected key points. In this case, patches are only generated as necessary so that all of the key points fall within a central part of at least one of the generated patches. That is, the region of the test image containing the selected key points is identified, and patches of a predetermined size are generated to cover that region (so each patch may include multiple selected key points).

Figure 11A:
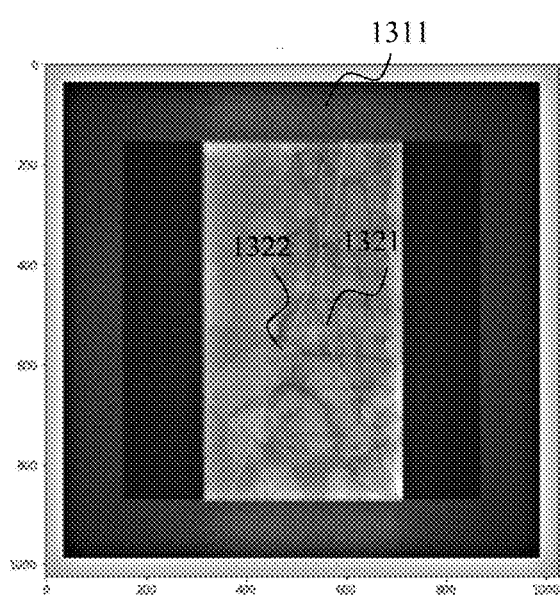
FIG. 11A is an illustrative display of a test image with segmentation results obtained using patches covering the entire test image, according to a representative embodiment.
Figure 11B:
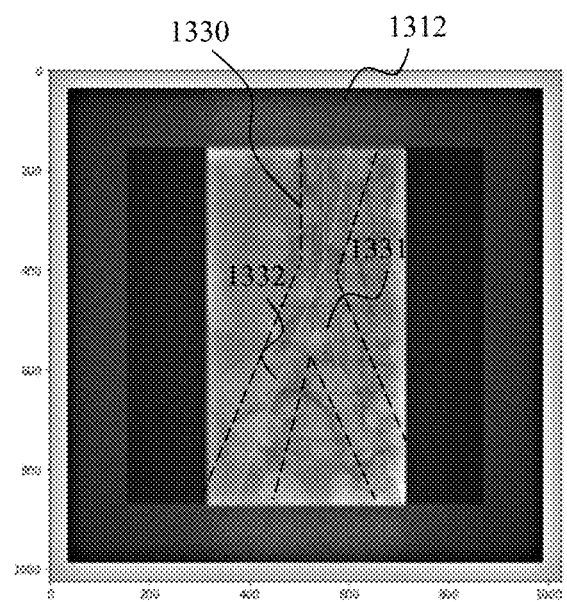
FIG. 11B is an illustrative display of a test image with segmentation results obtained using patches generated in a region defined by key points, according to a representative embodiment.

FIG. 11A shows a test image with segmentation results obtained using patches covering the entire test image, and FIG. 11B shows a test image with segmentation results obtained using patches generated in a region defined by key points, according to a representative embodiment.

In FIG. 11A, a test image 1311 shows two interventional devices, first segmented guidewire 1321 and second segmented guidewire 1322. In the depicted example, the first and second segmented guidewires 1321 and 1322 were obtained using 49 patches of 256×256 pixels each that are positioned at a regular stride of 128 pixels to cover the entire test image 1311.

In FIG. 11B, a test image 1312 shows first segmented guidewire 1331 and second segmented guidewire 1332 corresponding to the same two interventional devices as in the test image 1311. In the depicted example, the first and second segmented guidewires 1331 and 1332 were obtained using only 13 patches generated from the 49 salient key points. That is, a region 1330 was determined based on the locations of the 49 salient key points in the test image 1312, and then the region 1330 was divided into the 13 patches containing all 49 salient key points. As can be seen, the first and second segmented guidewires 1321 and 1322 in FIG. 11A and the first and second segmented guidewires 1331 and 1332 in FIG. 11B are substantially the same, even with the fewer patches used in FIG. 11B. Also, the technique used in FIG. 11B results in approximately four times improvement in processing speed.

Adapting Deep Learning Algorithm

Deep learning algorithms are achieving exceptional results compared to traditional image processing based methods. Deep learning needs large amount of data, which may not be readily available when the first version of the algorithm has been developed. It has been shown that deep learning algorithm performance is often proportional to the amount of data made available. As discussed above, new types of data or data with different characteristics than the original training data may come out sometime after initial deployment of the deep learning algorithm, resulting in decreased performance.

Various embodiments provide a generic adaptation to a deep learning algorithm (segmentation model) to unseen cases caused by new data. With multiple layers of adaptation strategies, the embodiments enable the deep learning algorithm to accommodate the new data without the delay and expense of having to collect and annotate large amounts of the new data to obtain ground truth and without having to update the software. Furthermore, any adaptation will be communicated with the algorithm developers, e.g., via the cloud, for further inspection. For example, for FORS, a deep learning based interventional device segmentation model is developed for automatic registration. When automatic registration does not succeed, the user reverts to a semi-automatic mode, which includes manually indicating the interventional device in the x-ray images and automatically adapting the segmentation model parameters and/or thresholds to the imaging protocol. The various embodiments provide for different adaptations, including (1) optimizing thresholds to the imaging protocol while keeping the model intact, (2) changing image pre-processing, (3) applying transfer learning locally with the data at site, and (4) aggregating data from multiple sites and applying transfer learning with the aggregated data, e.g., in the cloud, to make more significant changes to the segmentation model. Generally, there are two stages, including creating a ground truth segmentation map from semi-automatic shape registration, and updating the thresholds, the input image pre-processing, or the parameters of the deep learning algorithm.

Figure 12:
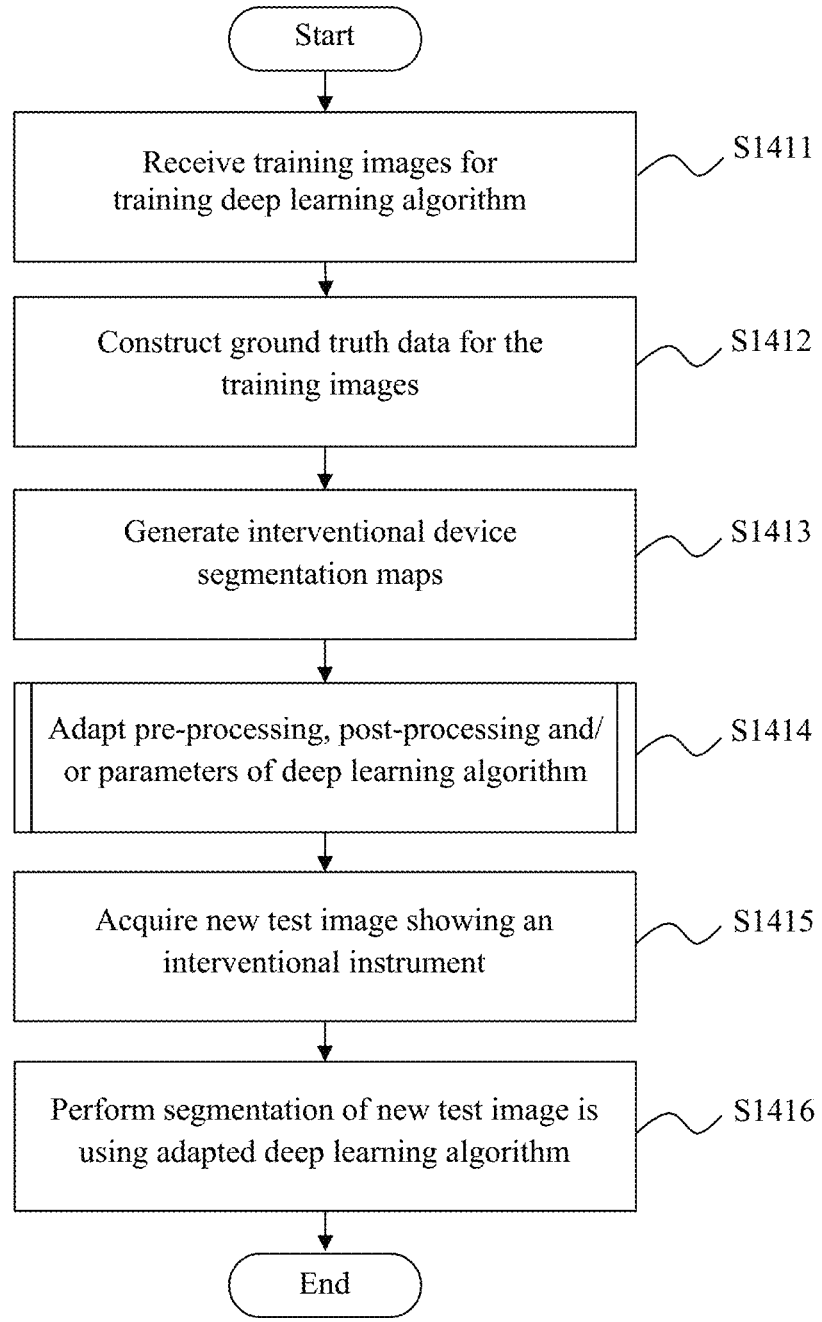
FIG. 12 is a simplified flow diagram showing a method of adapting aspects of a deep learning algorithm for performing segmentation of an image, according to a representative embodiment.

FIG. 12 is a simplified flow diagram showing a method of adapting aspects of a segmentation model for performing segmentation of an image, according to a representative embodiment.

Referring to FIG. 12, training images are received for training the segmentation model in block S1411. The training images may be any of various types of medical images, such as x-ray, CT scan, MM, ultrasound, or PET imaging, for example. The training images may include live images received from an imaging device and/or previously obtained images from a database of training images. The database of training images may be local to the facility at which the segmentation model is used or may be built and accessible over multiple facilities.

In block S1412, ground truth data are constructed for the training images, e.g., using semi-automatic shape registration to determine registered shape positions. The registered shape positions are used to compute interventional device segmentation maps in block S1413, indicating an interventional device in each training image. The ground truth data and segmentation maps may be determined according to the process identified in block S212 in FIG. 2 and described in detail in FIG. 3, discussed above, for example. Also, other techniques for constructing ground truth data and determining segmentation maps may be incorporated, without departing from the scope of the present teachings. For example, in FORS, shape registration aligns the shape with the interventional device in each training image (e.g., an x-ray image). Using semi-automatic shape registration, the user indicates the device tip in two x-ray images and the rest of the interventional device is detected. The shape is then registered (aligned) with the position of the interventional device in the x-ray images.

Figures 13A, 13B:
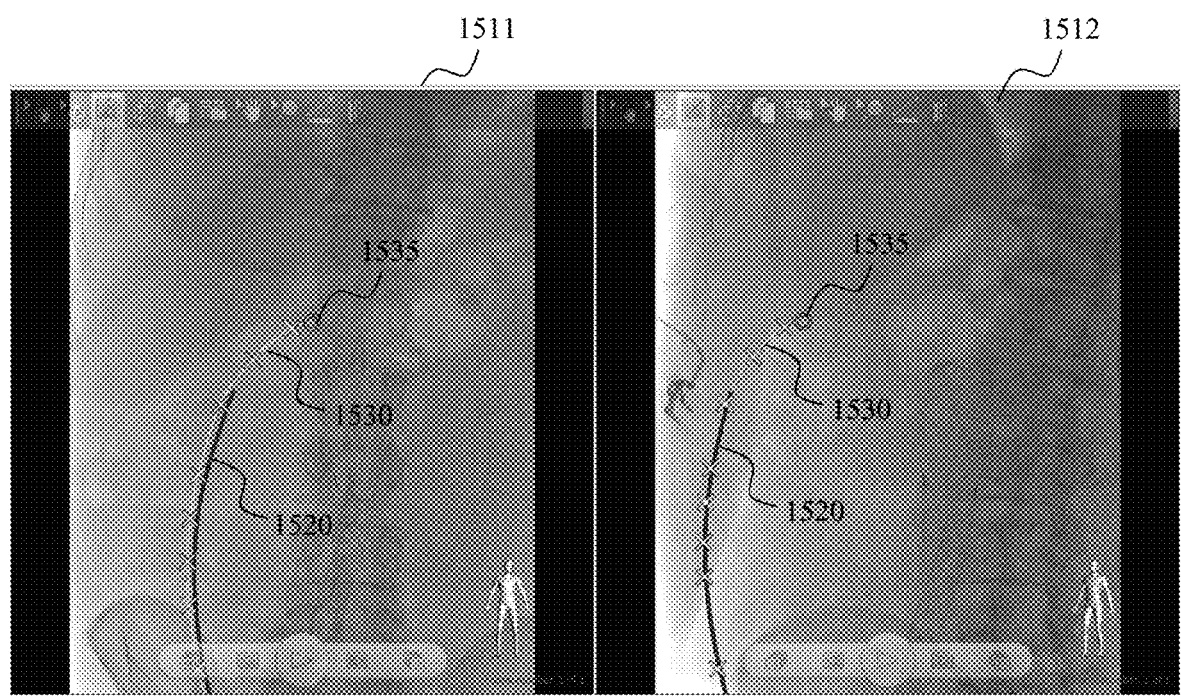
FIG. 13A is an illustrative display of a training image showing a segmented interventional device after shape registration, according to a representative embodiment.
FIG. 13B is an illustrative display of a training image showing the segmented interventional device after shape registration from another viewing angle, according to a representative embodiment.

FIG. 13A is an illustrative display of a training image showing a segmented interventional device after shape registration, and FIG. 13B is an illustrative display of the training image acquired at a different angle from FIG. 13A showing the segmented interventional device after shape registration, according to a representative embodiment. Two images acquired at different angles of an x-ray system are used for shape registration.

Referring to FIG. 13A, an x-ray training image 1511 shows images of a catheter 1520 and a guidewire 1530 that are respectively aligned with the FORS shape data of these devices. FIG. 13B shows an x-ray training image 1512 again showing images of the catheter 1520 and the guidewire 1530 aligned with the respective sensed FORS shapes from a different angle. A distal tip point 1535 shows the distal tip region of the guidewire 1530, which has been manually identified by the user in the semi-automatic shape registration. Non-tip device points, indicated by X's along the guidewire 1530 are automatically determined. Registration parameters are used to align the shape of the guidewire 1530 and the catheter 1520 in the x-ray image, and a device segmentation map is generated for the guidewire 1530 to use for deep learning model performance improvement.

When registration is confirmed, the 3D FORS shape data of the catheter 1520 (first interventional device), when projected on the x-ray image, indicates the position of the catheter 1520. Similarly, the 3D FORS shape data of the guidewire 1530 (second interventional device), when projected on the x-ray image, indicates the position of the guidewire 1530. (In FIG. 13A, the catheter 1520 has not been registered to the x-ray image in order to show the shape and position of the guidewire 1530 more clearly.) The shape registration may also include extrapolation to provide a more accurate position of the catheter 1520. Because the projected shape points and the pixel density are different, the projected shape points may be combined by determining a minimum cost path, which can be performed for example using by Dijkstra's shortest path algorithm, described by E. Dijkstra, "A note on two problems in connexion with graphs," *Numerische Mathermatik,* 1:269-271 (1959), which is hereby incorporated by reference in its entirety. As previously mentioned, the minimum cost path may also be performed by the method described above with reference to FIG. 3, although any compatible minimum cost path determination technique may be incorporated without departing from the scope of the present teachings. In another embodiment, at the tip region, it may be better to refine the segmentation map by using the user-entered distal tip point 1535. Similar to other parts of the catheter 1520, a minimum cost path can be determined from the user-entered tip to the shape tip. When the device map is computed for FORS guidewire, it can be extended to the catheter 1520. Specifically, starting from the catheter 1520 tip, all of the proximal side of the guidewire 1530 can be assigned as the catheter segmentation map.

Block S1414 indicates processes by which aspects of the segmentation model are adjusted based on the ground truth data to improve the output, including automatically adapting post-processing of the segmentation model results, pre-processing of input data to the segmentation model, and/or one or more parameters of the segmentation model itself. Automatically adapting the post-processing may include adapting a threshold to an imaging protocol for the segmentation model to provide an optimal threshold, discussed below with reference to FIG. 14. Automatically adapting the pre-processing may include adapting input data to the segmentation model, discussed below with reference to FIG. 15. Automatically adapting the one or more parameters of the segmentation model is discussed below with reference to FIG. 16.

In block S1415, a new test image is acquired showing an interventional instrument. The new test image may be a newly acquired image of the subject using the same (or same type) imaging device used to obtain the training images, or may be selected from among the thumbnail images, as discussed above. In block S1416, segmentation of the test image is performed using the adapted segmentation model determined in block S1414.

Figure 14:
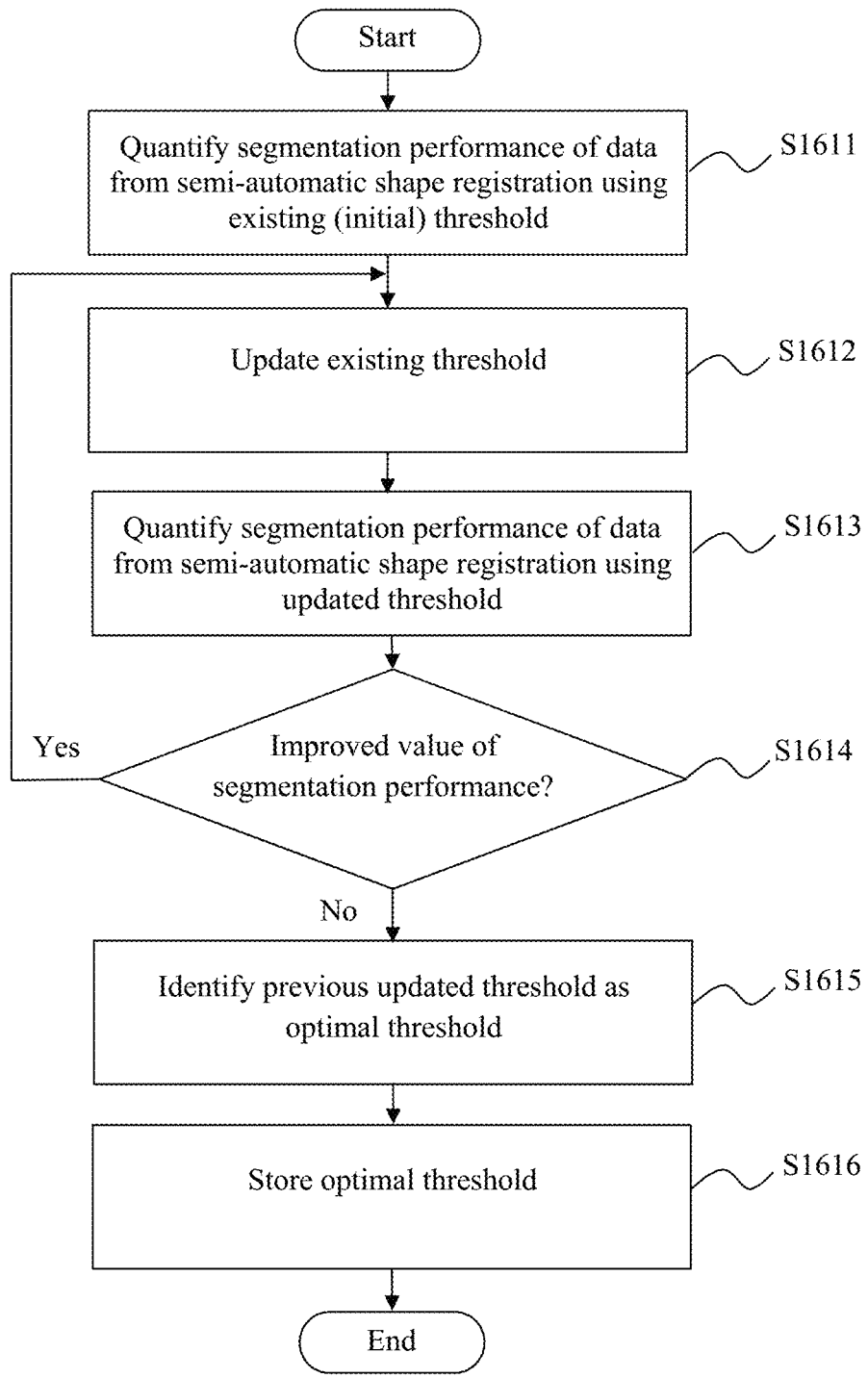
FIG. 14 is a simplified flow diagram showing a method of adapting post-processing of deep learning algorithm results by optimizing a threshold of the imaging protocol for performing image segmentation, according to a representative embodiment.

FIG. 14 is a simplified flow diagram showing a method of adapting a threshold of the imaging protocol for performing image segmentation, according to a representative embodiment. Generally, when semi-automatic shape registration is used, it is likely that deep learning based segmentation of the interventional device has failed to generate good results. This may be caused, for example, by a mismatch between a predetermined default threshold obtained from the training data and an optimal threshold for current data. As indicated above, the threshold is the value used to generate a segmentation map from a response image that is obtained by applying the segmentation model on the test image. Accordingly, adjusting the threshold of segmentation model results during post-processing may improve segmentation performance.

Referring to FIG. 14, current segmentation performance of data output by the segmentation model during the semi-automatic shape registration is quantified in block S1611 to obtain a segmentation performance value. The segmentation performance of the data may be quantified by comparing the data to the ground truth data, obtained using an existing threshold (e.g., an initial threshold for the first instantiation or otherwise an existing threshold at the start of the process). The existing threshold may be initially set for the segmentation model as zero. Quantifying the segmentation performance may include computing an overlap between the data output by the segmentation model and the ground truth data, which may be indicated by Dice coefficient, for example. The Dice coefficient (DSC) is intersection over union, as provided by Equation (1):

$$DSC = \frac{2|X \cap Y|}{|X| + |Y|} \qquad \text{Equation (1)}$$

In blocks S1612 to S1614, the threshold is repeatedly updated to obtain a most favorable value of the quantified segmentation performance. That is, the existing threshold is updated by increasing or decreasing the existing threshold by a predetermined increment in block S1612, and the segmentation performance of data output by the segmentation model is quantified in block S1613 using the updated threshold to obtain another segmentation performance value. In block S1614, the segmentation performance value is compared to the previous segmentation performance value (obtained using the previous threshold) to determine which threshold provides a more favorable result. When the segmentation performance value obtained using the updated threshold is better than the segmentation performance value obtained using the previous threshold (block S1614: Yes), the process returns to block S1612 to continue updating the threshold to see if there can be further improvement. When the segmentation performance value obtained using the updated threshold is not better than the segmentation performance value obtained using the previous threshold (block S1614: No), the process continues to block S1615, where the previous threshold is identified as an optimal threshold. That is, in the depicted embodiment, it is assumed that further updates to the threshold will continue to produce less favorable results, and thus the previous threshold has the most favorable segmentation performance value for use with the segmentation model. Of course, other processes for repeatedly updating the thresholds and comparing corresponding segmentation performance values to find the most favorable segmentation performance value may be incorporated without departing from the scope of the present teachings.

In block S1616, the updated threshold corresponding to the most favorable value of the quantified segmentation performance is stored as the optimal threshold for use with the segmentation model. For example, the optimal threshold may be used to perform segmentation of interventional devices from new test images using the segmentation model. When new shape registration cannot be performed automatically, the threshold may be updated by using all the data stored for the semi-automatic shape registration. Also, when multiple attempts to determine the optimal threshold have failed, or insufficient data has been collected, it may be useful to update parameters of the segmentation model, as discussed below with reference to FIG. 16.

Figure 15:
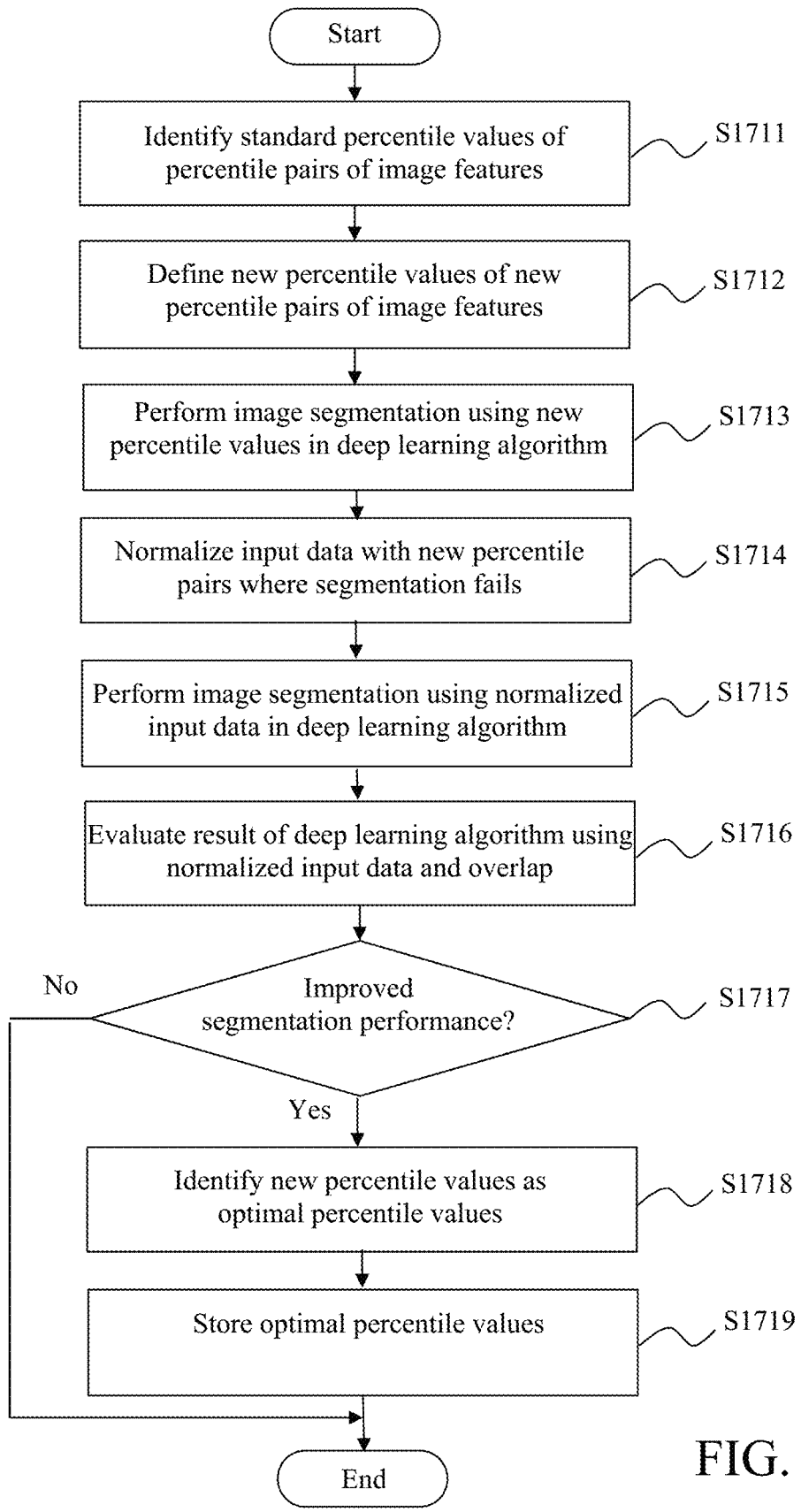
FIG. 15 is a simplified flow diagram showing a method of adapting pre-processing of the deep learning algorithm by optimizing input data to deep learning algorithm, according to a representative embodiment.

FIG. 15 is a simplified flow diagram showing a method of adapting input data to segmentation model, according to a representative embodiment. Generally, the input data may be changed during pre-processing before being fed into the segmentation model. The input data may include intensity and vesselness features of the training images, for example. The pre-processing includes intensity scaling or vesselness scaling, according to which input feature values of the input data at specific percentile values are mapped to standard percentile values before providing the input data to the segmentation model. The developers of the algorithm may define the pre-processing steps that are most influential in the segmentation model performance, e.g., identified during development of the segmentation model, and share these defined pre-processing steps with the end user as part of deployment. Alternatively, the most influential pre-processing steps may be automatically determined, either at the time of training the segmentation model or at the time of deployment the segmentation model, following training. Based on this analysis, there may be a list of pre-processing steps defined for adaptation of the input data. Adjusting the features of the input data to the segmentation model during pre-processing may improve segmentation performance.

Referring to FIG. 15, standard percentile values [$P_{low}$, $P_{high}$] of percentile pairs for image features are identified in block S1711. The features may be intensity or vesselness of pixels, as discussed above. $P_{low}$ refers to lower percentile value, such as 0.5, and $P_{high}$ refers to higher percentile value, such as 99.5. The standard percentile values may be default values, provided by the developers of the algorithm or may be determined empirically, for example. New percentile values [$_1$i, $P_2$] of percentile pairs are defined in block S1712 based on the standard percentile values used in the training of the segmentation model. The percentile values may be determined by setting a percentile range. For example, $P_{low}$ ($P_1$) may be any value in the percentile range [0, 5], while $P_{high}$ ($P_2$) may be any value in the percentile range [95, 100], although other percentile ranges may be incorporated without departing from the scope of the present teachings.

In block S1713, image segmentation is performed using the new percentile values in segmentation model. Performing segmentation typically results in failure of the segmentation in all or a part of the image. Wherever the segmentation fails, the input data for each of the new percentile pairs are used for normalization in block S1714. The normalized input data are provided as new input data to the segmentation model in block S1715, and the image segmentation is repeated. To save time, the data may be processed one at a time, and the further data can be sent only after getting favorable results with the first set(s) of data.

In block S1716, a result of the segmentation model using the normalized input data are evaluated, e.g., using a computed overlap between the data output by the segmentation model and the ground truth data are evaluated. Again, the computed overlap may be indicated by the Dice coefficient, for example.

In block S1717, it is determined based on the evaluation whether performance of the segmentation model improves using the setting for the new percentile values of the percentile pairs versus using the standard percentile values. When the performance of the segmentation model improves, the new percentile values are identified and set as optimal percentile values in block S1718, and are stored in block S1719 to apply to the segmentation model for future input data of the same image type.

Figure 16:
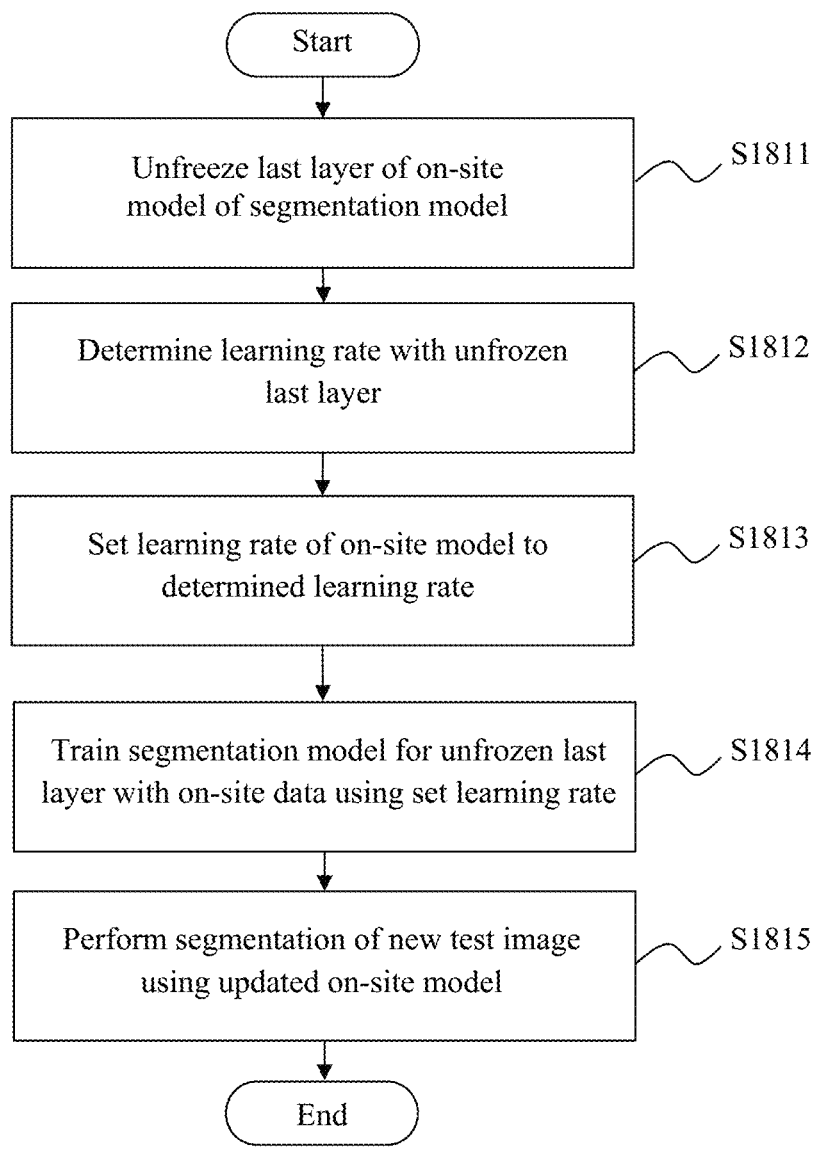
FIG. 16 is a simplified flow diagram showing a method of updating an on-site model of the segmentation model with on-site data, according to a representative embodiment.
Figure 17:
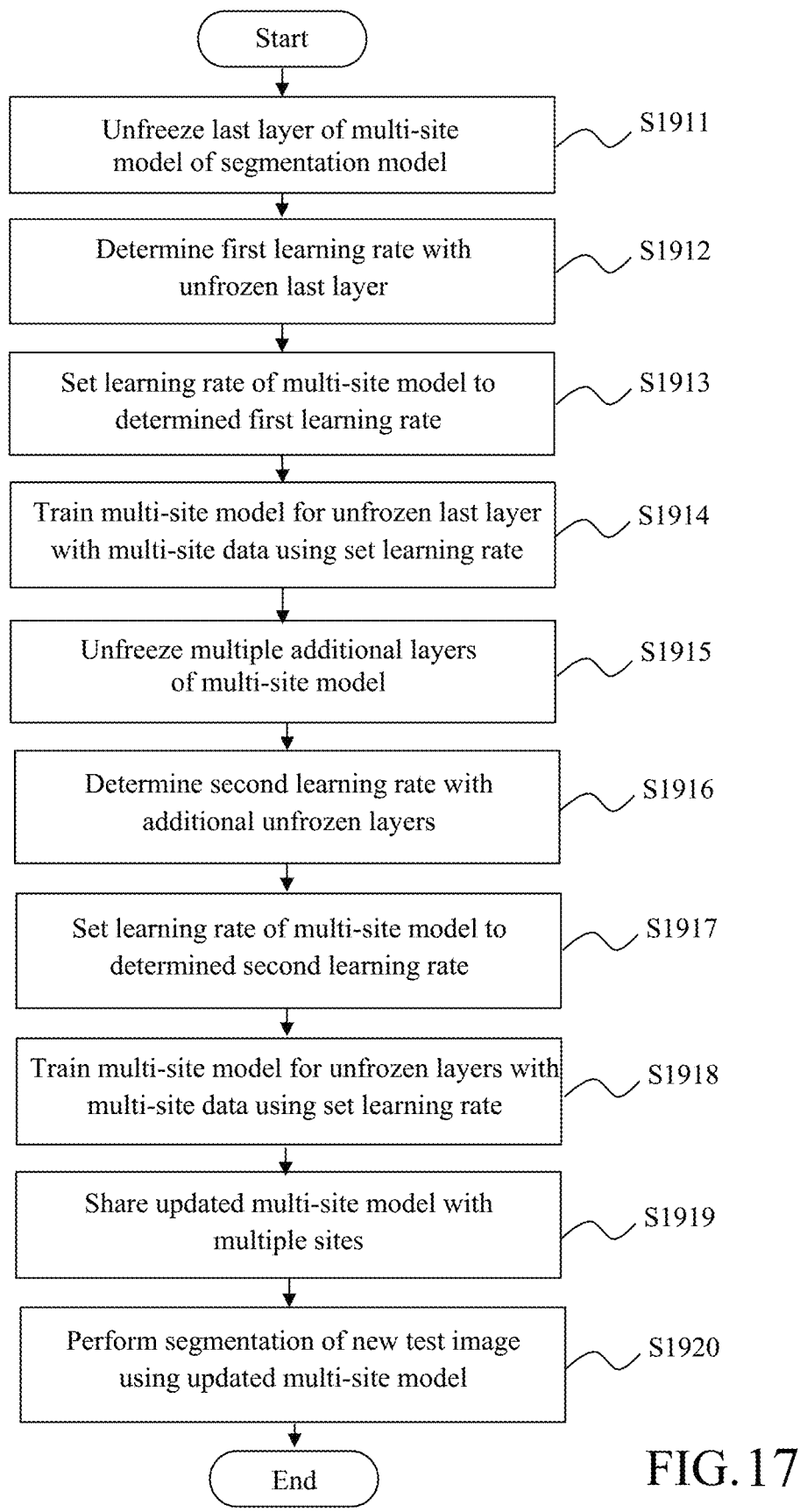
FIG. 17 is a simplified flow diagram showing a method of updating a multi-site model of the segmentation model with multi-site data, according to a representative embodiment.

FIG. 16 is a simplified flow diagram showing a method of updating the an on-site model of the segmentation model, according to a representative embodiment, and FIG. 17 is a simplified flow diagram showing a method of updating the multi-site model of the segmentation model, according to a representative embodiment.

Generally, model parameters of the segmentation model are adapted with the new data to provide an updated segmentation model. In various embodiments, two types of updates are possible: an on-site model of the segmentation model may be updated with on-site data, and a multi-site model of the segmentation model may be updated on a network with multi-site data. In an embodiment, the multi-site model may be cloud-based, as would be apparent to one skilled in the art. On-site data refers to data collected and maintained at a single facility, which is the facility applying the segmentation model to be trained. Multi-site data refers to data collected and maintained at multiple facilities joined together in a data sharing network, one of which is the facility applying the segmentation model to be trained. The on-site and multi-site data may include, for example, x-ray imaging data, and FORS shape data for interventional devices, such as guidewires, registered to the x-ray, from which required data for model update (e.g., intensity data, vesselness data, and ground truth data) can be obtained.

The main parameters that may be adjusted to update both the on-site model and the multi-site model are the learning rate of the segmentation model and its scheme, and the number of layers available to unfreeze. The layers of the segmentation model refer to a set of mostly uniform operations that are applied in parallel to an input and generate an output. Each layer is associated with the depth of (deep) neural network. Each layer or a combination of neighboring layers can be grouped to form a block with a unit depth. Multiple blocks are combined to construct a deep neural network. Unfreezing a layer refers to enabling weights of a layer to be modified during the training. Generally, the learning rate and the number of layers to unfreeze are adjusted depending on the amount of data to be used to update the segmentation model, where there is less data for the on-site model than for the multi-site model.

Referring to FIG. 16, the last layer of the on-site model of the segmentation model is unfrozen in block S1811. The last layer of the on-site model typically refers to the last layer of the encoder and decoder parts of the U-net. Depending on the architecture, a different definition can be considered. Generally, unfreezing a layer allows a weight associated with each of the unfrozen layers to be modified. Although the number of layers to unfreeze in the on-site model is typically only the last layer, a low number of multiple layers may be unfrozen in various applications. The on-site model is trained to modify the weights of the unfrozen layer by using the available on-site data.

In block S1812, the learning rate for the on-site model is determined with the last layer unfrozen. The maximum learning rate may be determined using a determination algorithm, an example of which involving the one cycle paradigm has been described previously.

A learning rate of the on-site model is set in block S1813 to the learning rate determined in block S1812, enabling the extent of changes that may be made. For the on-site model, the learning rate may be set to a low value, such as 0.0001, for example, to enable making small changes to the on-site model using on-site data as input data. Lower learning rate is preferred when there is less data and when making smaller changes to the model is desired. This is useful for updating the on-site model based on only the on-site data, which will likely be less extensive than the available multi-site data. The on-site model may include multiple learning rates for different capabilities, in which case, more than one learning rate may be set as desired.

In block S1814, the on-site model is trained for the unfrozen last layer with the on-site data using the set learning rate, providing an updated on-site model. For the training, using the set maximum learning rate, the one cycle paradigm is applied to determine the learning rate per epoch. The on-site model may be trained using an optimization algorithm, which determines and implements incremental changes to the on-site model during iterations of training the on-site model. The optimization algorithm may be a gradient-descent optimization algorithm, for example, for computing network parameters, such as stochastic gradient descent with momentum, as described by Sutskever et al., "On the Importance of Initialization and Momentum in Deep Learning," *Proc. ICML,* vol. 28, pp. 111-1139:1147 (June 2013), which is hereby incorporated by reference in its entirety. Of course, other types of optimization algorithms may be incorporated without departing from the scope of the present teachings, as would be apparent to one skilled in the art.

Training the on-site model includes starting with the on-site model that is being used on that site, and updating the unfrozen layer weights of that network with the on-site acquired data. For the data, the x-ray registered FORS shape may be used to generate ground truth data. The vesselness feature is extracted for each x-ray image used for training. Preprocessing of the intensity and the vesselness images is performed in the same way as previously explained. The loss function used in training is also the same as the previously described loss function. In other words, the training is similar, although here it starts with an already trained segmentation model, and uses the newly acquired on-site data. Also, since the segmentation model has already been trained, only the last layer or so is updated. In block S1815, segmentation of a new test image including an interventional device is performed using the updated on-site model.

Referring to FIG. 17, the last layer of the multi-site model of the segmentation model is unfrozen in block S1911 to allow a weight associated with the unfrozen last layer to be modified. In block S1912, a learning rate is determined for the multi-site model with the last layer unfrozen. The maximum learning rate may be determined using a determination algorithm, an example of which involving the one cycle paradigm has been described previously.

A learning rate of the multi-site model is set in block S1913 to the first learning rate determined in block S1912, enabling the extent of changes that may be made. For the multi-site model of the segmentation model, the maximum learning rate is set to a usually high value, such as 0.01, for example, to enable making more changes to the multi-site model, using a larger amount of data and a larger variation in the data. Having set the maximum learning rate, the one cycle paradigm is applied to determine the learning rate per epoch. As a result of the high learning rate, more changes can be made to the multi-site model for better adaptation. In block S1914, the multi-site model is trained for the unfrozen last layer with the multi-site data using the set learning rate from block S1913, providing an updated multi-site model. The multi-site model may be trained using an optimization algorithm, which determines and implements incremental changes to the multi-site model during iterations of training the multi-site model. As discussed above, the optimization algorithm may be a gradient-descent optimization algorithm, for example.

Then, in block S1915, one or more additional layers of the multi-site model are unfrozen to allow weights associated with the unfrozen layers to be modified. That is, the last layer remains unfrozen, and at least one additional layer (e.g., two additional layers) immediately preceding the last layer are unfrozen. In block S1916, the learning rate determination algorithm is applied to the multi-site model in order to determine second learning rates for the multi-site model with the multiple unfrozen layers. Subsequent training uses this learning rate.

The learning rates of the multi-site model are set in block S1917, where the learning rate(s) of the additional layer(s) preceding the last layer are set to the second learning rate(s) determined in block S1916. The learning rate of the last layer may be set to the first learning rate determined in block S1912, or another first learning rate may be determined for the last layer in block S1916, without departing from the scope of the present teachings. Generally, the learning rate(s) of the additional (earlier) layer(s) are lower than the learning rate of the last layer. For example, the learning rate(s) of the additional layer(s) may be set to one tenth of the learning rate of the last layer. The learning rate(s) of the additional layer(s) are set to a value lower than that of the last layer so that the changes for the weights will be less. That is, the weights of these earlier layer(s) are more trusted, so changes in these weights should be less. This ensures that the weights of later layers can be modified more whereas the allowed change on the weights of the earlier layers is smaller. As stated above, for the multi-site model of the segmentation model, the learning rate is set to a high value to enable making more changes to the multi-site model, using a larger amount of data and a larger variation in the data. For example, the leaning rage of the last layer may be set to 0.01, while the learning rate(s) of the additional layer(s) may be set to 0.001.

In block S1918, the multi-site model is trained for the unfrozen last layer and the unfrozen one or more additional layers with the multi-site data using the set learning rates from block S1917, providing further updated multi-site model. Again, the multi-site model may be trained using an optimization algorithm (e.g., a gradient-descent optimization algorithm). The updated multi-site model may be shared with the multiple sites via the cloud, for example, in block S1919. Also, processing can be done in the cloud if it is a cloud application. A version of the multi-site model may be stored at the application site (on-site). Also, multiple versions of the multi-site model may be used, and the results from the various application sites may be fused to get a final result. In block S1920, segmentation of a new test image including an interventional device is performed using the updated multi-site model.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

Although developing adaptable predictive analytics has been described with reference to several exemplary embodiments, it is understood that the words that have been used are words of description and illustration, rather than words of limitation. Changes may be made within the purview of the appended claims, as presently stated and as amended, without departing from the scope and spirit of interventional procedure optimization in its aspects. Although developing adaptable predictive analytics has been described with reference to particular means, materials and embodiments, developing adaptable predictive analytics is not intended to be limited to the particulars disclosed; rather developing adaptable predictive analytics extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A method of segmenting an image of a region of interest of a subject, the method comprising:
    receiving a plurality of training images, at least some of the training images including at least one training interventional device;
    constructing ground truth data, including at least a ground truth image, for each training image;
    training a segmentation model using the plurality of training images based on intensity and vesselness features in the training images and the ground truth images associated with the training images;
    acquiring a new test image showing the region of interest of the subject;
    extracting vesselness values of pixels or voxels from the new test image;
    dividing the new test image into a plurality of patches; and
    performing segmentation of the new test image using the trained segmentation model to generate a segmentation image, corresponding to the new test image, with values indicating for each pixel or voxel in the segmentation image a presence or an absence of at least one interventional device.

2. The method of claim 1, wherein constructing the ground truth data for each training image of the plurality of training images that includes the at least one training interventional device comprises:
    zooming in to a distal tip of the at least one training interventional device;
    receiving a first indication of a first point at the distal tip from a user when zoomed in to the distal tip;
    zooming in to a most proximal part of the at least one training interventional device;
    receiving a second indication of a second point at the most proximal part from the user when zoomed in to the most proximal part;
    determining the minimum cost path of the at least one training interventional device between the first point and the second point according to a cost function that is based on vesselness strength at each pixel or voxel of the training image and path orientation;
    saving the minimum cost path of the at least one training interventional device and a device type of the at least one training interventional device; and
    generating a segmentation map of the at least one interventional device based on the determined minimum cost path and the device type.

3. The method of claim 2, wherein the cost function uses a vesselness filter for measuring elongatedness of a region around each of the pixels or voxels and for determining the path orientation of each of the pixels or voxels along a path, and
    wherein a cost of each of the pixels or voxels is a weighted summation of an inverse of the measured elongatedness and a difference in the path orientations between path points, so that the minimum cost path follows the at least one training interventional device in each training image as smoothly as possible.

4. The method of claim 1, wherein training the segmentation model comprises:
    selecting the training images and the associated ground truth images;
    preprocessing the selected training images;
    spatially normalizing the preprocessed training images so the preprocessed training images and the associated ground truth images have the same pixel or voxel resolution;
    identifying a plurality of patches in each spatially normalized training image and the associated ground truth image along a portion of the spatially normalized training image showing the at least one training interventional device, each patch of the plurality of patches having the same number of pixels or voxels;
    augmenting each spatially normalized training image to add variations to the plurality of patches in the spatially normalized training image and the associated ground truth image using one or more of zooming, rotation, noise addition, local contrast reduction or expansion, flipping, mirroring, and transposing training data in the training image; and
    training the segmentation model is trained using the augmented spatially normalized training images.

5. The method of claim 4, wherein preprocessing the training images comprises:
    preprocessing an intensity channel and a vesselness channel by applying a mapping operation to remove outliers in each of the training images, the mapping operation comprising:
    mapping an intensity range of the intensity channel to a predefined standard intensity range, where the intensity range is determined by sorting the intensity values of the intensity channel and determining the intensity values at predetermined percentiles to the standard intensity range; and
    mapping a vesselness range of the vesselness channel to a predefined standard vesselness range, where the vesselness range is determined by sorting the vesselness values of the vesselness channel and determining the vesselness values at predetermined percentiles to the standard vesselness range; and
    normalizing each of the mapped intensity channel and the mapped vesselness channel using statistics from the training dataset to have zero mean and unit standard deviation.

6. The method of claim 4, wherein training the segmentation model further comprises identifying a valid region in each training image, including a rectangular border, and
wherein identifying the plurality of patches in each spatially normalized training image comprises identifying at least some of the patches at the rectangular border of the valid region.

7. The method of claim 4, wherein training the segmentation model using the augmented spatially normalized training images comprises:
segmenting each augmented spatially normalized training image;
determining a weighted loss function of binary cross entropy and/or a variant of Jaccard coefficient for each segmented augmented training image;
determining a difference between each segmented training image or patches in each segmented training image and the ground truth image associated with the segmented training image using the weighted loss function;
for the plurality of training images, summing the determined difference between each segmented training image or patches in each segmented training image and the ground truth image associated with the segmented training image to provide a weighted sum; and
updating the segmentation model using the weighted sum.

8. The method of claim 5, wherein predetermined percentiles for determining the intensity values are 0.5 or 99.5, and the standard intensity range is [0,1], and
wherein predetermined percentiles for determining the vesselness values are 0.5 or 99.5, and the standard vesselness range is [0,1].

\* \* \* \* \*